(12) United States Patent
Babu et al.

(10) Patent No.: US 9,846,539 B2
(45) Date of Patent: Dec. 19, 2017

(54) RECOVERY FROM LOW SPACE CONDITION OF AN EXTENT STORE

(71) Applicant: NetApp, Inc., Sunnyvale, CA (US)

(72) Inventors: Sriranjani Babu, San Jose, CA (US);
Mandar Naik, San Jose, CA (US);
Srinath Krishnamachari, Mountain View, CA (US); Dhaval Patel, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 43 days.

(21) Appl. No.: 15/004,101

(22) Filed: Jan. 22, 2016

(65) Prior Publication Data

US 2017/0212690 A1 Jul. 27, 2017

(51) Int. Cl.
*G06F 12/02* (2006.01)
*G06F 3/06* (2006.01)
*G06F 11/14* (2006.01)

(52) U.S. Cl.
CPC .......... *G06F 3/0608* (2013.01); *G06F 3/0641* (2013.01); *G06F 3/0655* (2013.01);
(Continued)

(58) Field of Classification Search
CPC ............. G06F 11/1407; G06F 11/1435; G06F 3/0608; G06F 3/0641; G06F 3/0655;
(Continued)

(56) References Cited

U.S. PATENT DOCUMENTS 5,511,190 A 4/1996 Sharma et al.
5,937,425 A 8/1999 Ban
(Continued)

OTHER PUBLICATIONS

Cornwell, Michael, "Anatomy of a Solid-state Drive," ACM Queue—Networks, vol. 10, No. 10, Oct. 2012, pp. 1-7.
(Continued)

*Primary Examiner* — Pierre-Michel Bataille
(74) *Attorney, Agent, or Firm* — Cesari and McKenna, LLP

(57) ABSTRACT

A technique recovers from a low space condition associated with storage space reserved in an extent store to accommodate write requests received from a host and associated metadata managed by a layered file system of a storage input/output (I/O) stack executing on one or more nodes of a cluster. The write requests, including user data, are persistently recorded on non-volatile random access memory (NVRAM) prior to returning an acknowledgement to the host by a persistence layer of the storage I/O stack. Volume metadata managed by a volume layer of the layered file system is embodied as mappings from logical block addresses (LBAs) of a logical unit (LUN) accessible by the host to extent keys maintained by an extent store layer of the layered file system. Extent store metadata managed by the extent store layer is embodied as mappings from the extent keys to the storage locations of the extents on storage devices of storage arrays coupled to the nodes of the cluster. The space recovery technique accounts for storage space consumed in the extent store by user operations, i.e., write operations for the user data stored on the NVRAM at the persistence layer as well as the associated volume and extent store metadata, to ensure that the user data and associated metadata can be safely and reliably persisted in the extent store even during a low space condition.

19 Claims, 14 Drawing Sheets

(52) U.S. Cl.
CPC .......... *G06F 3/0665* (2013.01); *G06F 3/0685* (2013.01); *G06F 3/0688* (2013.01); *G06F 11/1407* (2013.01); *G06F 11/1435* (2013.01)

(58) Field of Classification Search
CPC .... G06F 3/0665; G06F 3/0685; G06F 3/0688; G06F 3/06; G06F 11/14
USPC ........................................................ 711/103
See application file for complete search history.

(56) References Cited

U.S. PATENT DOCUMENTS

| | | | |
|---|---|---|---|
| 7,167,951 B2* | 1/2007 | Blades | G06F 3/0607 711/112 |
| 7,249,150 B1 | 7/2007 | Watanabe et al. | |
| 7,325,059 B2 | 1/2008 | Barach et al. | |
| 7,644,087 B2 | 1/2010 | Barkai et al. | |
| 7,680,837 B2 | 3/2010 | Yamato | |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,205,065 B2 | 6/2012 | Matze | |
| 8,261,085 B1 | 9/2012 | Fernandez Gutierrez | |
| 8,341,457 B2 | 12/2012 | Spry et al. | |
| 8,417,987 B1 | 4/2013 | Goel et al. | |
| 8,495,417 B2 | 7/2013 | Jernigan, IV et al. | |
| 8,539,008 B2 | 9/2013 | Faith et al. | |
| 8,560,879 B1 | 10/2013 | Goel | |
| 8,595,595 B1 | 11/2013 | Greanac et al. | |
| 8,806,115 B1 | 8/2014 | Patel et al. | |
| 8,832,363 B1 | 9/2014 | Sundaram et al. | |
| 8,996,535 B1 | 3/2015 | Kimmel et al. | |
| 2003/0120869 A1 | 6/2003 | Lee et al. | |
| 2003/0200388 A1 | 10/2003 | Hetrick | |
| 2005/0144514 A1 | 6/2005 | Ulrich et al. | |
| 2006/0004957 A1 | 1/2006 | Hand et al. | |
| 2007/0143359 A1 | 6/2007 | Uppala | |
| 2008/0155190 A1 | 6/2008 | Ash et al. | |
| 2009/0083478 A1 | 3/2009 | Kunimatsu et al. | |
| 2009/0132770 A1 | 5/2009 | Yen-Chin | |
| 2009/0150599 A1 | 6/2009 | Bennett | |
| 2010/0042790 A1 | 2/2010 | Mondal et al. | |
| 2010/0088296 A1 | 4/2010 | Periyagaram et al. | |
| 2010/0205353 A1 | 8/2010 | Miymoto et al. | |
| 2011/0035548 A1 | 2/2011 | Kimmel et al. | |
| 2011/0191522 A1 | 8/2011 | Condict et al. | |
| 2011/0213928 A1 | 9/2011 | Grube et al. | |
| 2012/0151118 A1 | 6/2012 | Flynn et al. | |
| 2012/0226841 A1* | 9/2012 | Nguyen | G06F 13/4059 710/112 |
| 2012/0239869 A1 | 9/2012 | Chiueh et al. | |
| 2012/0290788 A1 | 11/2012 | Klemm et al. | |
| 2012/0311246 A1 | 12/2012 | McWilliams et al. | |
| 2013/0018854 A1 | 1/2013 | Condict | |
| 2013/0080559 A1* | 3/2013 | Rao | H04L 67/1097 709/208 |
| 2013/0138862 A1 | 5/2013 | Motwani et al. | |
| 2013/0238832 A1 | 9/2013 | Dronamraju et al. | |
| 2013/0238932 A1 | 9/2013 | Resch | |
| 2013/0246424 A1* | 9/2013 | Deninger | G06N 5/02 707/737 |
| 2013/0268497 A1 | 10/2013 | Baldwin et al. | |
| 2013/0346810 A1 | 12/2013 | Kimmel et al. | |
| 2014/0114931 A1* | 4/2014 | Cline | H04L 67/18 707/690 |
| 2014/0325117 A1 | 10/2014 | Canepa et al. | |
| 2015/0134926 A1 | 5/2015 | Yang et al. | |
| 2015/0370715 A1* | 12/2015 | Samanta | G06F 11/00 711/113 |
| 2016/0077674 A1* | 3/2016 | Forster | G06F 3/0481 715/753 |
| 2016/0371021 A1* | 12/2016 | Goldberg | G06F 3/0619 |

OTHER PUBLICATIONS

"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Leventhal, Adam H., "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the 23$^{rd}$ ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
Rosenblum, Mendel, et al., "The Design and Implementation of a Log-Structured File System," Proceedings of the 13$^{th}$ ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.
Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

RECOVERY FROM LOW SPACE CONDITION OF AN EXTENT STORE

BACKGROUND

Technical Field

The present disclosure relates to storage systems and, more specifically, to recovery from a low space condition of an extent store of a storage system.

Background Information

A storage system typically includes one or more storage devices, such as disks embodied as solid state drives (SSDs), into which information may be entered, and from which information may be obtained, as desired. The storage system may implement a high-level module, such as a file system, to logically organize the information stored on disk as storage containers, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the disks for the data.

A plurality of storage systems may be interconnected as a cluster and configured to operate according to a client/server model of information delivery to thereby allow one or more clients (hosts) to access, e.g., via one or more write requests, the storage containers. For example, the host may issue a write request that includes user data intended for persistent storage on a portion of a storage container served by the storage system. To reduce latency, the storage system may initially store each write request in non-volatile random access memory (rather than on disk) and respond to the host acknowledging that the write request has been persistently stored on the storage system. The storage system may thereafter store the user data on the intended portion of the storage container on disk. However, to enable safe and reliable persistent storage of the user data (and associated metadata) on disk, it is desirable that the storage system reserve storage space on the disks to accommodate the user data and associated metadata even during a low space condition.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
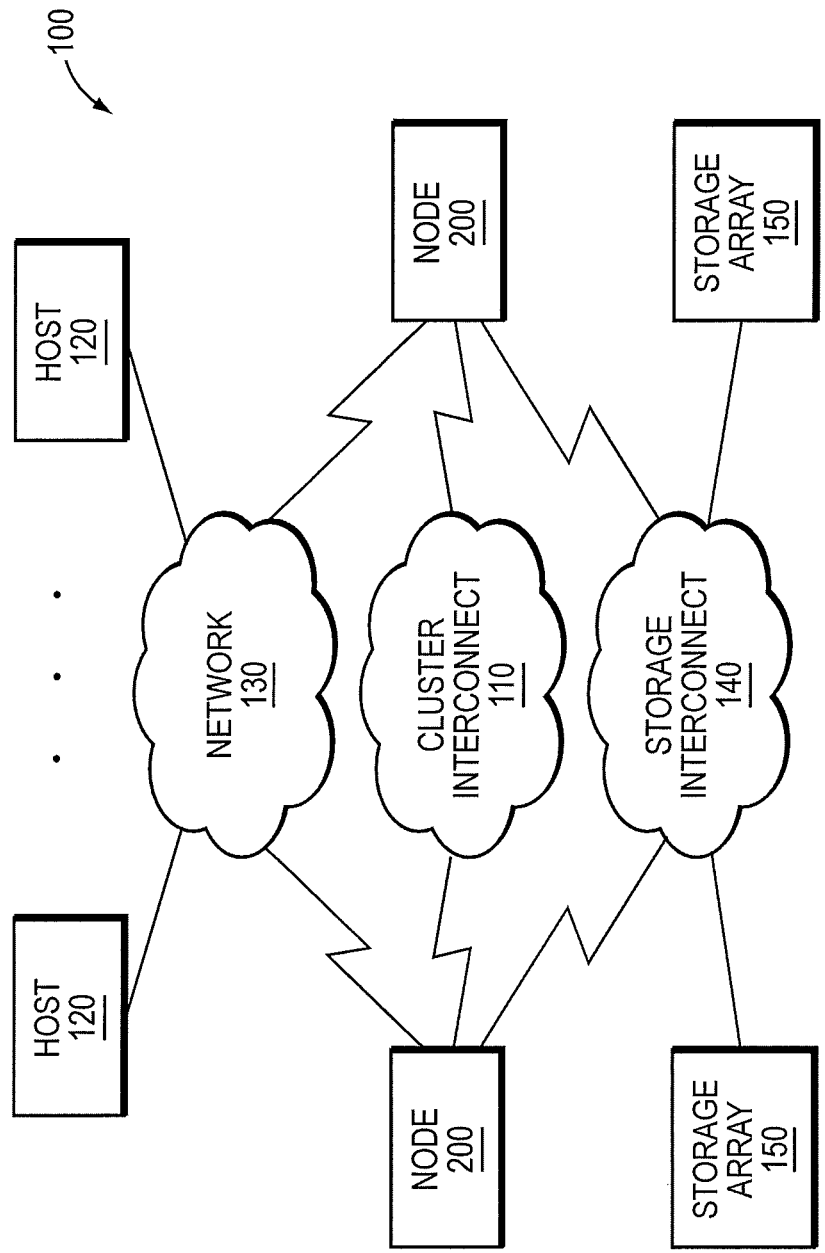
FIG. 1 is a block diagram of a plurality of nodes interconnected as a cluster.

Embodiments described herein are directed to a technique for recovering from a low space condition associated with storage space reserved in an extent store to accommodate write requests received from a host and associated metadata managed by a layered file system of a storage input/output (I/O) stack executing on one or more nodes of a cluster. The write requests, including user data, are persistently recorded on non-volatile random access memory (NVRAM) prior to returning an acknowledgement to the host by a persistence layer of the storage I/O stack. The metadata managed by a volume layer of the layered file system, i.e., volume metadata, is embodied as mappings from logical block addresses (LBAs) of a logical unit (LUN) accessible by the host to durable extent keys maintained by an extent store layer of the layered file system. The volume metadata may be processed as user operations executed by finite state machines (FSMs) at the volume layer. Each extent key is a unique cluster-wide identifier associated with a storage location for an extent, which is a variable length block of data that may be aggregated from the user data (or metadata) of one or more write requests directed to a LBA range of the LUN. The metadata managed by the extent store layer, i.e., extent store metadata, is embodied as mappings from the extent keys to the storage locations of the extents on storage devices of storage arrays coupled to the nodes of the cluster. As used herein, the extent store may be viewed as a global pool of extents stored on the storage arrays.

In an embodiment, the space recovery technique accounts for storage space consumed in the extent store by the user operations, i.e., write operations for the user data stored on the NVRAM at the persistence layer as well as the associated volume and extent store metadata, to ensure that the user data and associated metadata can be safely and reliably persisted in the extent store as, e.g., user operation extents even during a low space condition. Storage space accounting provides a space reservation budget of available storage space for the user operation extents (i.e., available user operation storage space) in the extent store. When the available user operation storage space of the space reservation budget is consumed, i.e., the low space condition is reached, the extent store layer sends an overflow event notification to the persistence and volume layers. In response, new write requests from the host are not accepted at the persistence layer and the FSMs at the volume layer slowly drain any processed metadata of pending user operations, e.g., via extent store put operations, to the extent store until user operation storage space is released (e.g., metadata is consolidated freeing storage space). If an amount of additional extent store storage space used during the low space condition exceeds a low space reserve threshold, the extent store layer sends a no space event notification to the persistence and volume layers, wherein the extent store layer does not accept any further put operations (metadata cleaning operations, however, may continue). Upon the released user operation storage space exceeding an available space threshold, the extent store layer sends an available event notification to the volume and persistence layers that instructs those layers that they may resume operation, including the acceptance of new write requests from the host.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
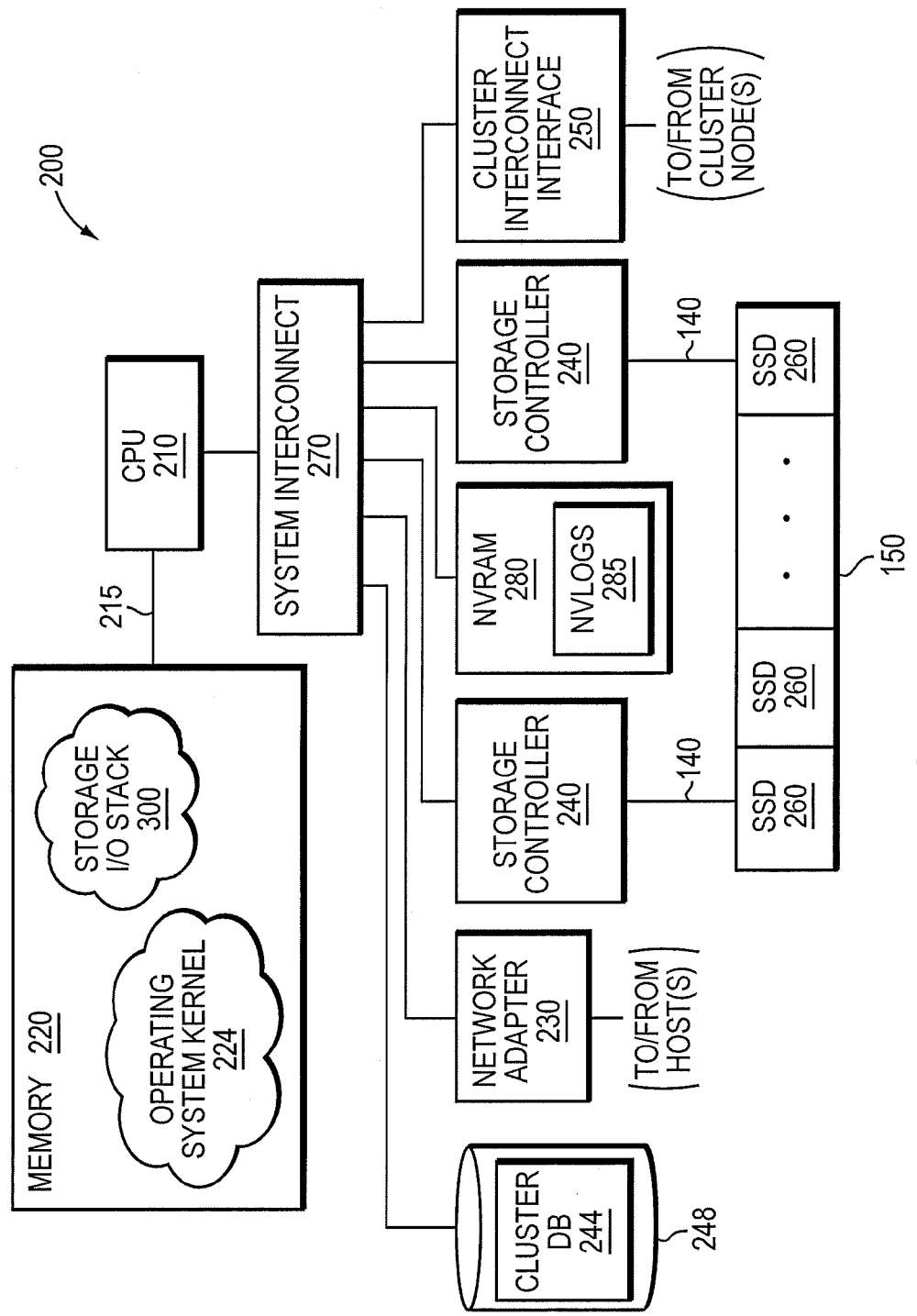
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
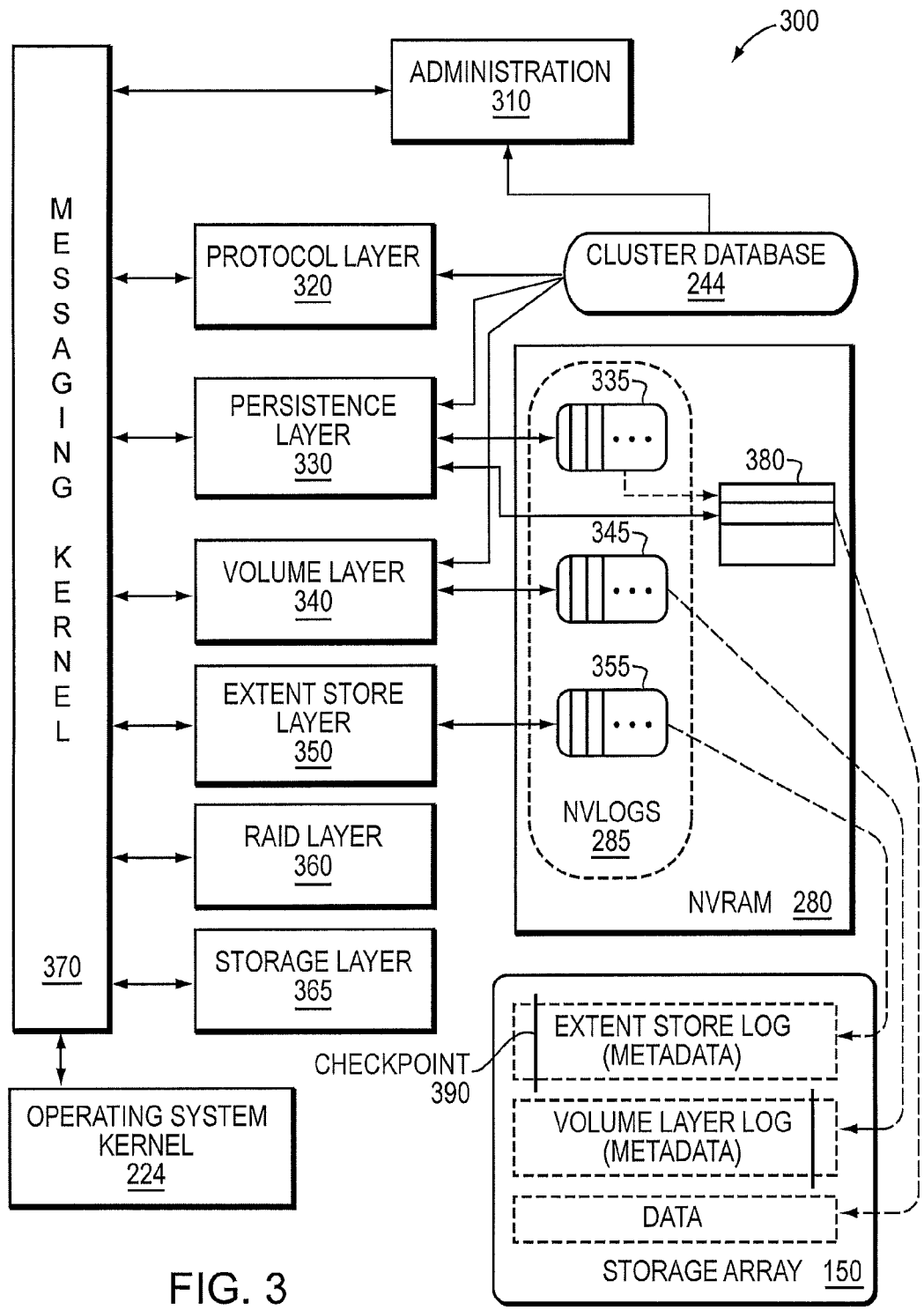
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LB A) of the LUN, a length (i.e., amount of data) and, in the case of a write request, user data (write data). The protocol layer 320 receives (accepts) the I/O request and forwards it to the persistence layer 330, which records the request into a persistent write-back cache 380, which may be illustratively embodied as NVLog 335, whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache 380 may be structured as a log. Notably, the write data for the write request may be physically stored in the cache 380 such that the NVLog 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
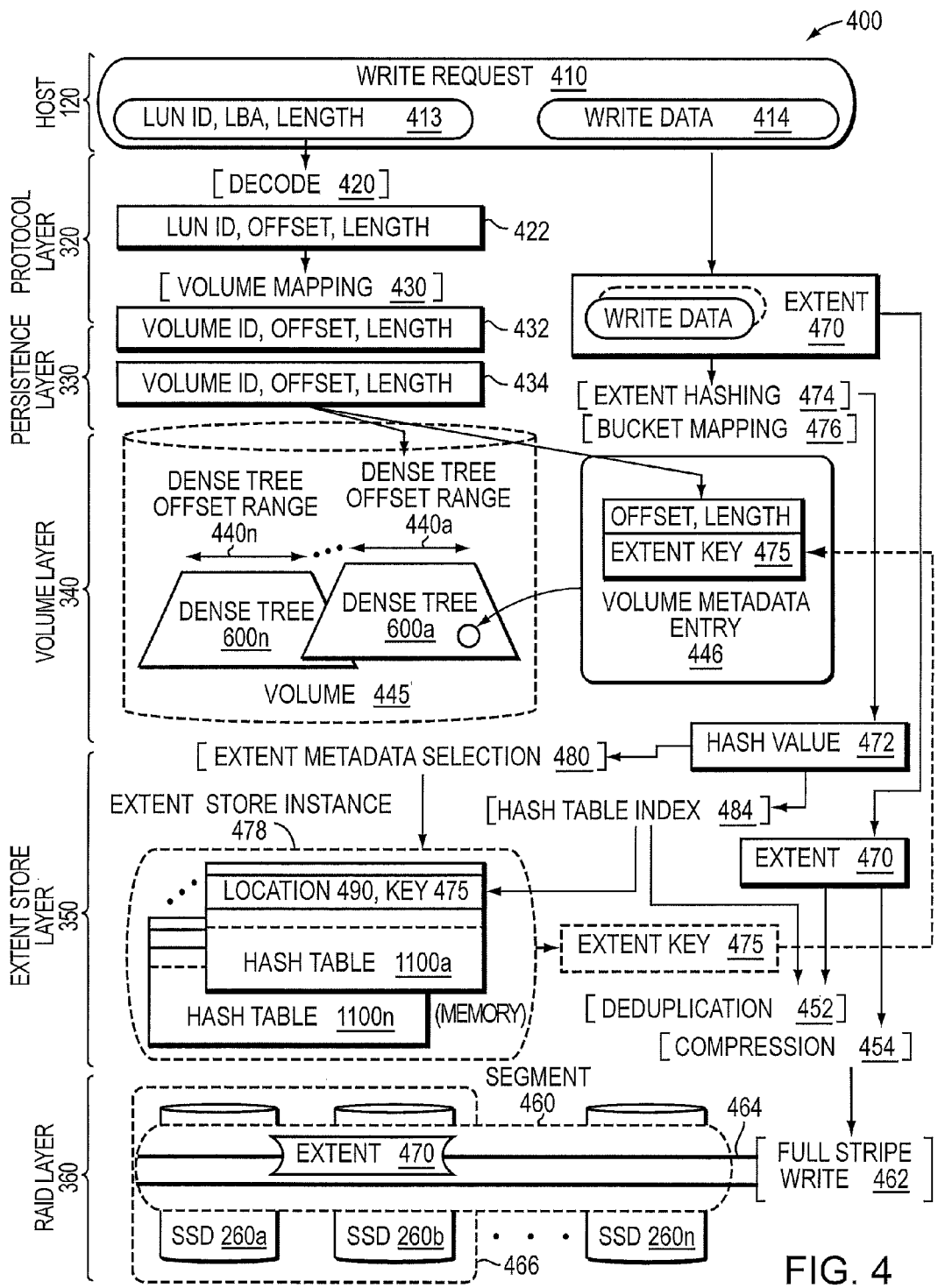
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistence layer 330 may then pass the write request with aggregated write data including, e.g., the volume ID, offset and length, as parameters 434 of a message to the appropriate volume layer instance. In an embodiment, message passing of the parameters 434 (received by the persistent layer) may be redirected to another node via the function shipping mechanism, e.g., RPC, for inter-node communication. Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 1100 (e.g., hash table 1100*a*) from a set of hash tables (illustratively in-core) within the extent store instance 478, and (ii) extracts a hash table index 484 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 480. If a table entry with a matching extent key is found, then the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 475 of the existing extent is passed to the appropriate volume layer instance for storage within an entry (denoted as volume metadata entry 446) of a dense tree metadata structure (e.g., dense tree 600*a*), such that the extent key 475 is associated an offset range 440 (e.g., offset range 440*a*) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 1100*n*) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260*b* for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 1100*n* (i.e., as selected by the new candidate extent key), (ii) passes a new extent key (denoted as extent key 475) to the appropriate volume layer instance for storage within an entry (also denoted as volume metadata entry 446) of a dense tree 600 managed by that volume layer instance, and (iii) records a change to extent store metadata of the selected hash table in the extent store layer log 355. Illustratively, the volume layer instance selects dense tree 600*a* spanning an offset range 440*a* of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 600. The volume layer instance then inserts the volume metadata entry 446 into the dense tree 600*a* and records a change corresponding to the volume metadata entry in the volume layer log 345. Accordingly, the I/O (write) request is sufficiently stored on SSD 260 of the cluster.

Read Path

Figure 5:
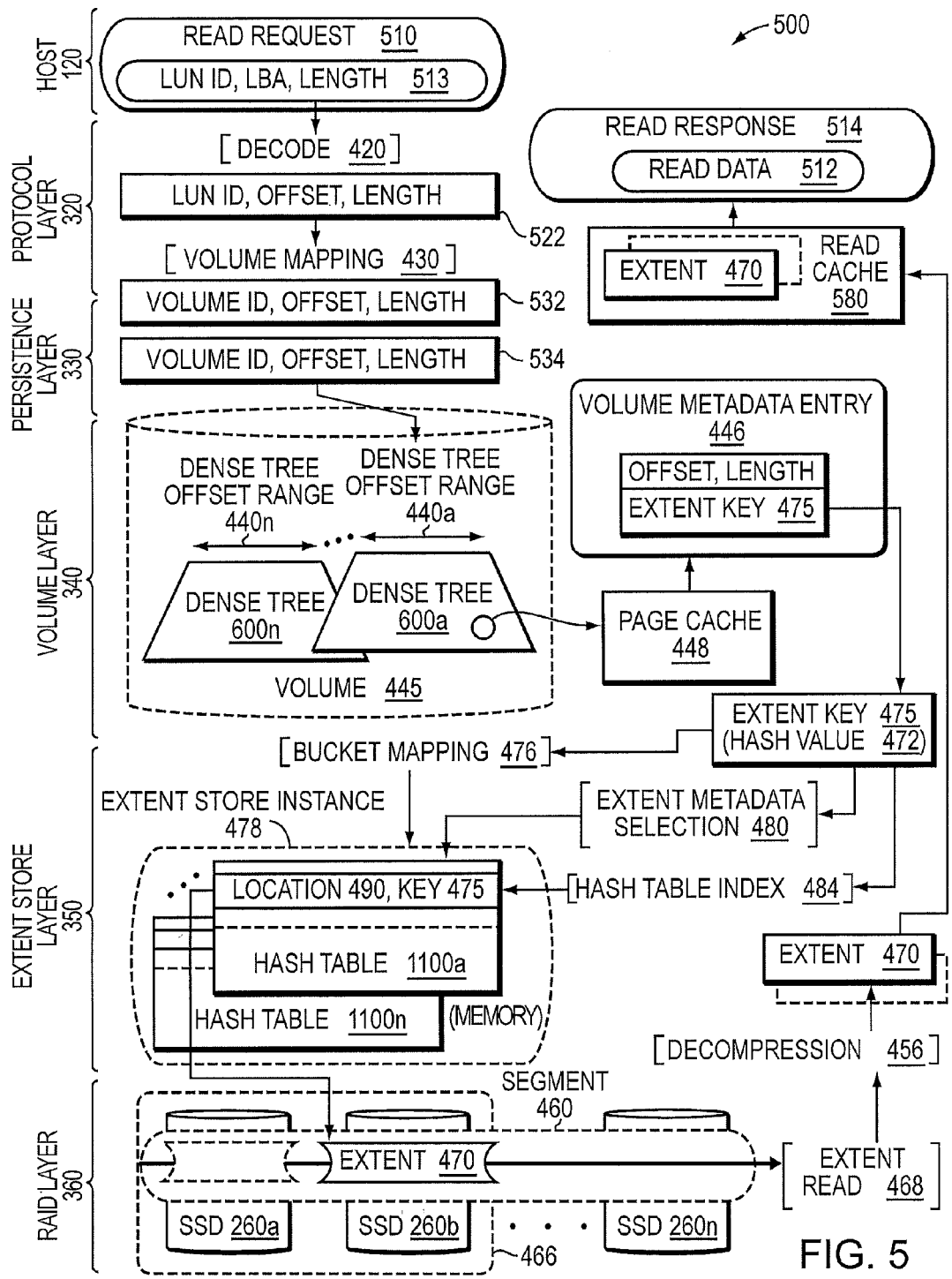
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 600*a*) associated with a region (e.g., offset range 440*a*) of a volume 445 that encompasses the requested offset range (specified by parameters 534). The volume layer instance may further process the read request to search for (lookup) one or more volume metadata entries 446 of the dense tree 600*a* to obtain one or more extent keys 475 associated with one or more extents 470 within the requested offset range. As described further herein, each dense tree 600 may be embodied as a multiple levels of a search structure with possibly overlapping offset range entries at each level. The entries, i.e., volume metadata entries 446, provide mappings from host-accessible LUN addresses, i.e., LBAs, to durable extent keys. The various levels of the dense tree may have volume metadata entries 446 for the same offset, in which case the higher level has the newer entry and is used to service the read request. A top level of the dense tree 600 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 475 for the entire requested read range are found. If no metadata entries exist for the entire or portions of the requested read range, then the missing portion(s) are zero filled.

Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 480 that (i) selects an appropriate hash table (e.g., hash table 1100a) from a set of hash tables within the extent store instance 478, and (ii) extracts a hash table index 484 from the extent key 475 (i.e., hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260b). The extent store instance then cooperates with the RAID storage layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 446) as a data structure, i.e., a dense tree metadata structure (dense tree 600), which maps an offset range within the region to one or more extent keys. The volume metadata may be processed by finite state machines (FSMs) associated with various volume layer operations. Operations on the volume metadata managed by the volume layer manifest as modifications or changes to metadata entries of the dense tree structure at offset ranges of the regions. Moreover, the operations (i.e., offset range operations) directed to the regions are illustratively processed by threads of execution, i.e., uniprocessor (UP) services, on CPUs of the nodes. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
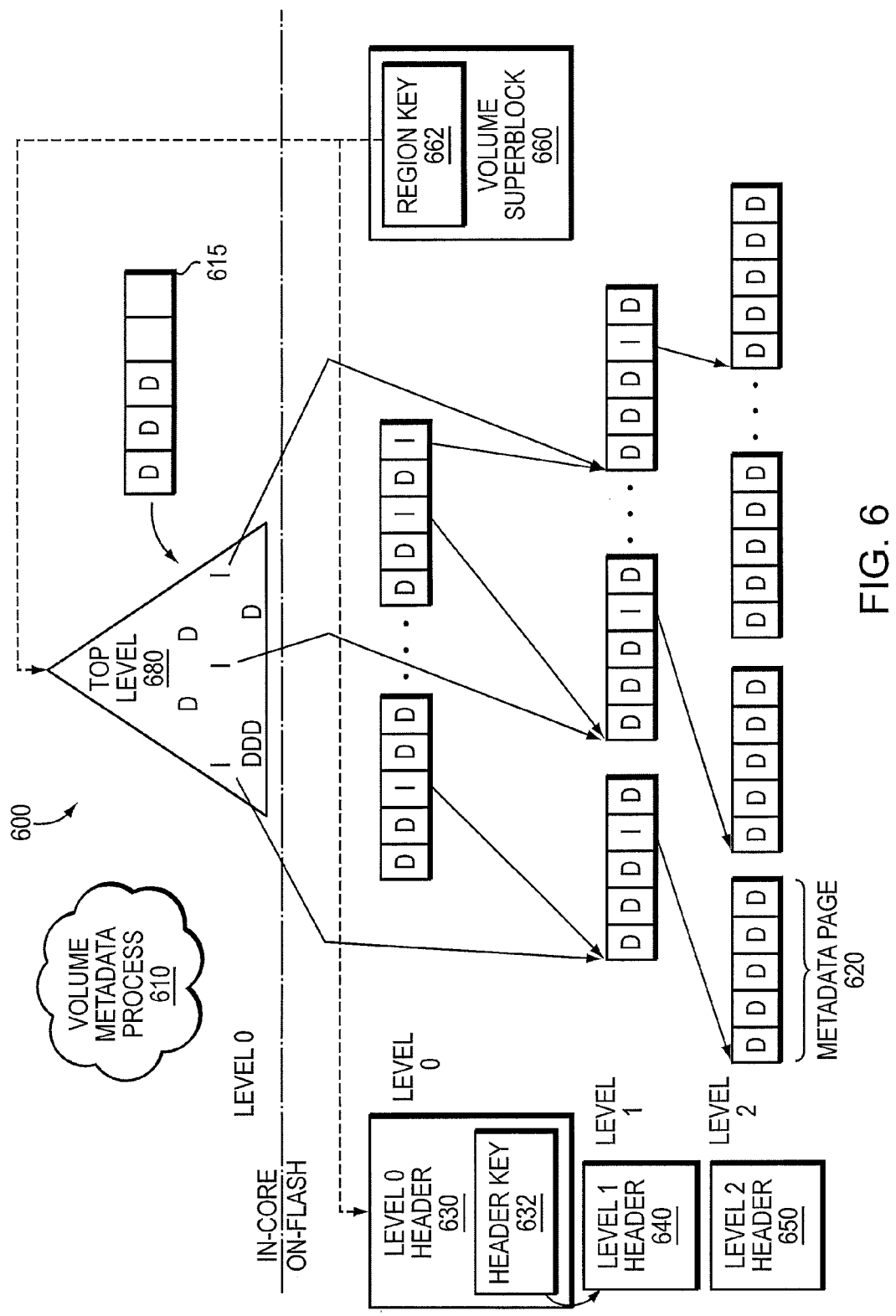
FIG. 6 is a block diagram of a dense tree metadata structure.

FIG. 6 is a block diagram of the dense tree metadata structure that may be advantageously used with one or more embodiments described herein. The dense tree metadata structure 600 is configured to provide mappings of logical offsets within a LUN (or volume) to extent keys managed by one or more extent store instances. Illustratively, the dense tree metadata structure is organized as a multi-level dense tree 600, where a top level 680 represents recent volume metadata changes and subsequent descending levels represent older changes. Specifically, a higher level of the dense tree 600 is updated first and, when that level fills, an adjacent lower level is updated, e.g., via a merge operation. A latest version of the changes may be searched starting at the top level of the dense tree and working down to the descending levels. Each level of the dense tree 600 includes fixed size records or entries, i.e., volume metadata entries 446, for storing the volume metadata. A volume metadata process 610 illustratively maintains the top level 680 of the dense tree in memory (in-core) as a balanced tree that enables indexing by offsets. The volume metadata process 610 also maintains a fixed sized (e.g., 4 KB) in-core buffer as a staging area (i.e., an in-core staging buffer 615) for volume metadata entries 446 inserted into the balanced tree (i.e., top level 680). Each level of the dense tree is further maintained on-flash as a packed array of volume metadata entries, wherein the entries are stored as extents illustratively organized as fixed sized (e.g., 4 KB) metadata pages 620. Notably, the staging buffer 615 is de-staged to SSD upon a trigger, e.g., the staging buffer is full. Each metadata page 620 has a unique identifier (ID), which guarantees that no two metadata pages can have the same content. Illustratively, metadata may not be de-duplicated by the extent store layer 350.

In an embodiment, the multi-level dense tree 600 includes three (3) levels, although it will be apparent to those skilled in the art that additional levels N of the dense tree may be included depending on parameters (e.g., size) of the dense tree configuration. Illustratively, the top level 680 of the tree is maintained in-core as level 0 and the lower levels are maintained on-flash as levels 1 and 2. In addition, copies of the volume metadata entries 446 stored in staging buffer 615 may also be maintained on-flash as, e.g., a level 0 linked list. A leaf level, e.g., level 2, of the dense tree contains data entries (D), whereas a non-leaf level, e.g., level 0 or 1, may contain both data entries and index entries. Each index entry (I) at level N of the tree is configured to point to (reference) a metadata page 620 at level N+1 of the tree. Each level of the dense tree 600 also includes a header (e.g., level 0 header 630, level 1 header 640 and level 2 header 650) that contains per level information, such as reference counts associated with the extents. Each upper level header contains a header key (an extent key for the header, e.g., header key 632 of level 0 header 630) to a corresponding lower level header. A region key 662 to a root, e.g., level 0 header 630 (and top level 680), of the dense tree 600 is illustratively stored on-flash and maintained in a volume root extent, e.g., a volume superblock 660. Notably, the volume superblock 660 contains region keys to the roots of the dense tree metadata structures for all regions in a volume. Further, the header of each level 630, 640, 650 may include a magic number and checksum (not shown), which may be used for verifying the data structure as described later herein.

Dense Tree Volume Metadata Checkpointing

When a level of the dense tree 600 is full, volume metadata entries 446 of the level are merged with the next lower level of the dense tree. As part of the dense tree merge, new index entries (I) are created in the level to point to new lower level metadata pages 620, i.e., data entries from the level are merged (and pushed) to the lower level so that they may be "replaced" with an index reference in the level. The top level 680 (i.e., level 0) of the dense tree 600 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 600 is the ratio K of the size of level N–1 to the size of level N. Illustratively, the size of the array at level N is K times larger than the size of the array at level N–1, i.e., sizeof(level N)=K*sizeof(level N–1). After K merges from level N–1, level N becomes full (i.e., all entries from a new, fully-populated level N–1 are merged with level N, iterated K times.)

Figure 7:
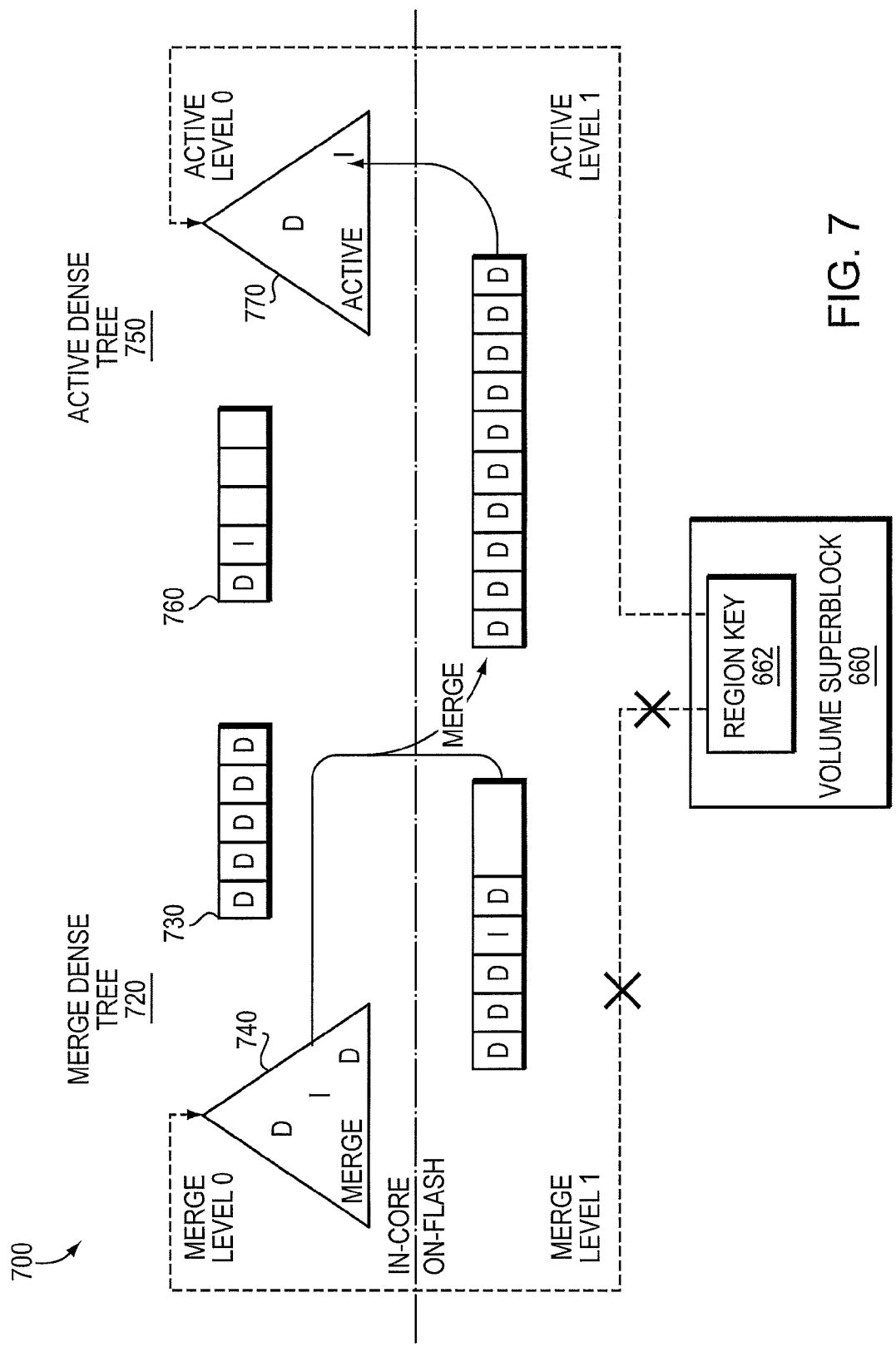
FIG. 7 illustrates merging between levels of the dense tree metadata structure.

FIG. 7 illustrates merging 700 between levels, e.g., levels 0 and 1, of the dense tree metadata structure. In an embodiment, a dense tree merge operation is triggered when level 0 is full. When performing the merge operation, the dense tree metadata structure transitions to a "merge" dense tree structure (shown at 720) that merges, while an alternate "active" dense tree structure (shown at 750) is utilized to accept incoming data. Accordingly, two in-core level 0 staging buffers 730, 760 are illustratively maintained for concurrent merge and active (write) operations, respectively. In other words, an active staging buffer 760 and active top level 770 of active dense tree 750 handle in-progress data flow (i.e., active user read and write requests), while a merge staging buffer 730 and merge top level 740 of merge dense tree 720 handle consistency of the data during a merge operation. That is, a "double buffer" arrangement may be used to handle the merge of data (i.e., entries in the level 0 of the dense tree) while processing active operations.

During the merge operation, the merge staging buffer 730, as well as the top level 740 and lower level array (e.g., merge level 1) are read-only and are not modified. The active staging buffer 760 is configured to accept the incoming (user) data, i.e., the volume metadata entries received from new put operations are loaded into the active staging buffer 760 and added to the top level 770 of the active dense tree 750. Illustratively, merging from level 0 to level 1 within the merge dense tree 720 results in creation of a new active level 1 for the active dense tree 750, i.e., the resulting merged level 1 from the merge dense tree is inserted as a new level 1 into the active dense tree. A new index entry I is computed to reference the new active level 1 and the new index entry I is loaded into the active staging buffer 760 (as well as in the active top level 770). Upon completion of the merge, the region key 662 of volume superblock 660 is updated to reference (point to) the root, e.g., active top level 770 and active level 0 header (not shown), of the active dense tree 750, thereby deleting (i.e., rendering inactive) merge level 0 and merge level 1 of the merge dense tree 720. The merge staging buffer 730 (and the top level 740 of the dense tree) thus becomes an empty inactive buffer until the next merge. The merge data structures (i.e., the merge dense tree 720 including staging buffer 730) may be maintained in-core and "swapped" as the active data structures at the next merge (i.e., "double buffered").

Figure 8:
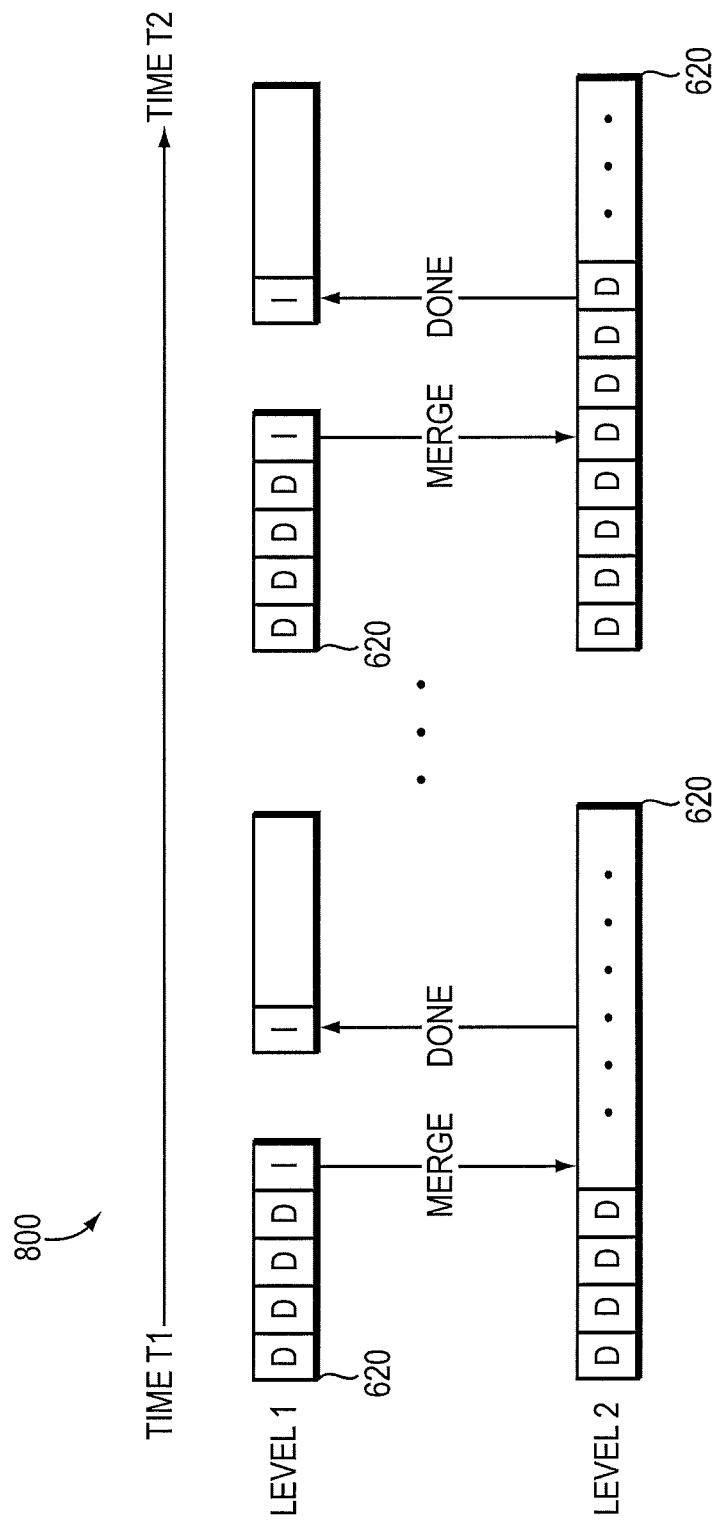
FIG. 8 illustrates batch updating between levels of the dense tree metadata structure.

FIG. 8 illustrates batch updating 800 between lower levels, e.g., levels 1 and 2, of the dense tree metadata structure. Illustratively, as an example, a metadata page 620 of level 1 includes four data entries D and an index entry I referencing a metadata page 620 of level 2. When full, level 1 batch updates (merges) to level 2, thus emptying the data entries D of level 1, i.e., contiguous data entries are combined (merged) and pushed to the next lower level with a reference inserted in their place in the level. The merge of changes of layer 1 into layer 2 illustratively produces a new set of extents on SSD, i.e., new metadata pages are also stored, illustratively, in an extent store instance. As noted, level 2 is illustratively several times larger, e.g., K times larger, than level 1 so that it can support multiple merges. Each time a merge is performed, some older entries that were previously on SSD may be deleted. Advantageously, use of the multi-level tree structure lowers the overall frequency of volume metadata that is rewritten (and hence reduces write amplification), because old metadata may be maintained on a level while new metadata is accumulated in that level until it is full. Further, when a plurality of upper levels become full, a multi-way merge to a lower level may be performed (e.g., a three-way merge from full levels 0 and 1 to level 2).

Dense Tree Volume Metadata Logging

In an embodiment, the volume layer log 345 is a two level, append-only logging structure, wherein the first level is NVRAM 280 (embodied as NVLogs 285) and the second level is SSD 260, e.g., stored as extents. New volume metadata entries 446 inserted into level 0 of the dense tree are also recorded in the volume layer log 345 of NVLogs 285. When there are sufficient entries in the volume layer log 345, e.g., when the log 345 is full or exceeds a threshold, the volume metadata entries are flushed (written) from log 345 to SSD 260 as one or more extents 470. Multiple extents may be linked together with the volume superblock 660 holding a key (i.e., an extent key) to the head of the list. In the case of recovery, the volume layer log 345 is read back to memory 220 to reconstruct the in-core top level 680 (i.e., level 0) of dense tree 600. Other levels may be demand paged via the page cache 448, e.g., metadata pages of level 1 are loaded and read as needed.

Figure 9:
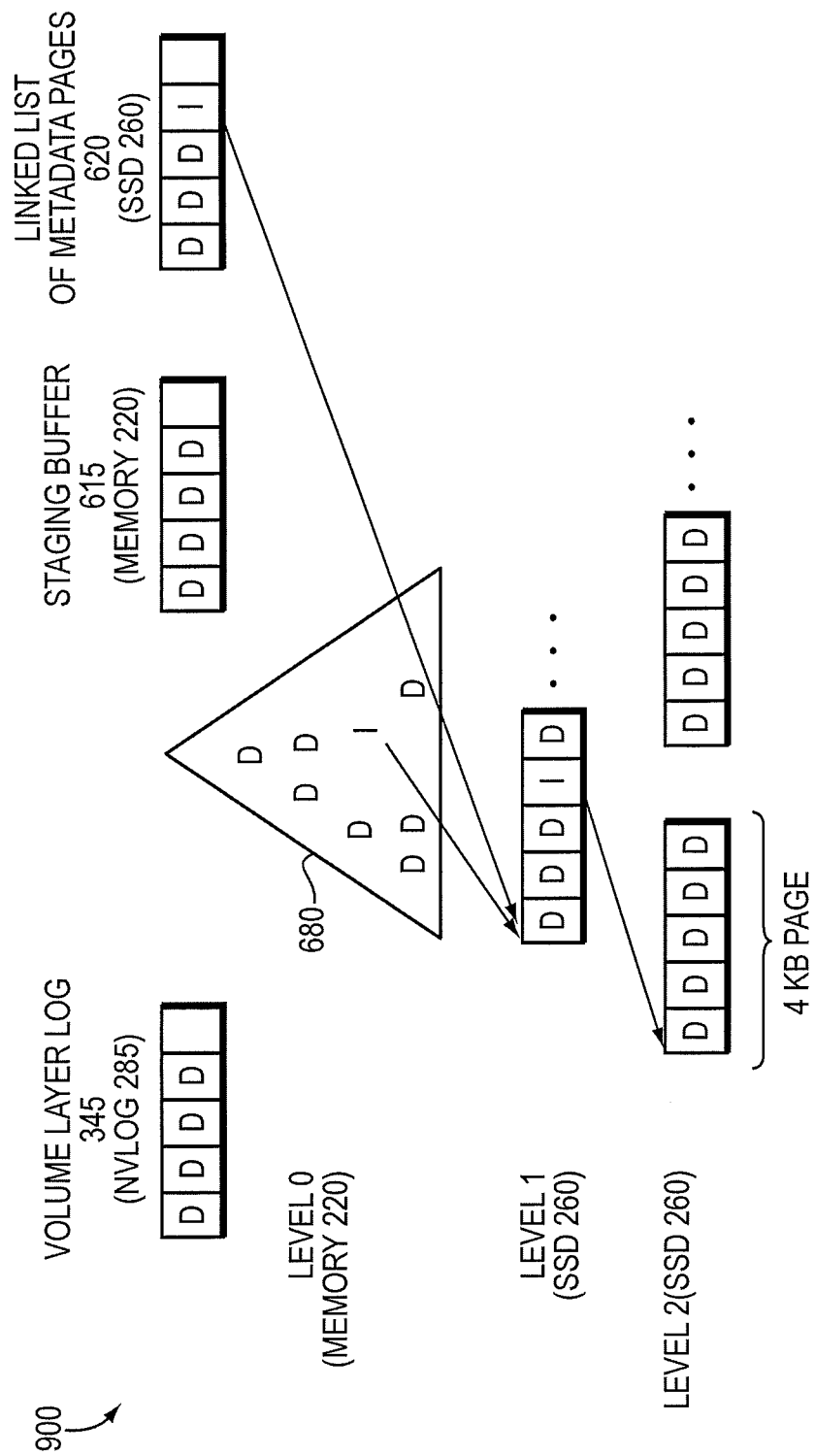
FIG. 9 illustrates volume logging of the dense tree metadata structure.

FIG. 9 illustrates volume logging 900 of the dense tree metadata structure. Copies of the volume metadata entries 446 stored in level 0 of the dense tree are maintained in persistent storage (SSD 260) and recorded as volume layer log 345 in, e.g., NVLogs 285. Specifically, the entries of level 0 are stored in the in-core staging buffer 615, logged in the append log (volume layer log 345) of NVLogs 285 and thereafter flushed to SSD 260 as a linked list of metadata pages 620. Copies of the level 0 volume metadata are maintained in-core as the active dense tree level 0 so as to service incoming read requests from memory 220. Illustratively, the in-core top level 680 (e.g., active dense tree level 0 770) may be used as a cache (for hot metadata), whereas the volume metadata stored on the other lower levels of the dense tree are accessed less frequently (cold data) and maintained on SSD. Alternatively, the lower levels also may be cached using the page cache 448.

Deferred Reference Count Update

In an embodiment, a deferred reference count update technique efficiently frees storage space for metadata (associated with data) to be deleted during a merge operation managed by the volume layer. As previously noted, the metadata is illustratively volume metadata embodied as mappings from LBAs of a LUN to extent keys maintained by the extent store layer. The volume layer organizes the volume metadata as a mapping data structure, i.e., a multi-level dense tree, where each level of the dense tree may include volume metadata entries for storing the volume metadata. Each level of the dense tree includes one or more metadata pages, each of which contains multiple volume metadata entries that provide the mappings from the host-accessible LBAs to the extent keys. Each metadata page is also stored as an extent and, thus, includes a page key (e.g., an extent key). When a level of the dense tree is full, the existing volume metadata entries of the level are merged with the next lower level of the dense tree. As part of the merge, new index entries are created in the level to point to new lower level metadata pages, i.e., data entries from the level are merged (and pushed) to the lower level so that they may be replaced with an index reference in the level. As a result, the existing (i.e., older) volume metadata entries of the level are no longer needed and, thus, are subject to deletion. That is, the metadata pages having the older (i.e., merged and no longer needed) volume metadata entries may be deleted. Notably, a merger of any entry in a metadata page renders that metadata page subject to deletion.

The extent store layer illustratively maintains a reference count on each key (e.g., page key or extent key); accordingly, a reference count (refcount) log may be employed to both delete (decrement) the refcount of the key and de-duplicate (increment) the refcount of the key. Note that refcount increments may occur as a result of volume metadata updates, such as overwrites and snapshot splitting. Illustratively, refcount increments may be processed during the merge operation, whereas refcount decrements (deletes) are deferred until the merge operation completes so as to permit simplified rollback and re-start of the merge operation. Note further that persistent storage of the page keys for deletion in the refcount log (as a separate, out-of-band data structure) enables low-overhead, i.e., does not consume much storage space on SSD when persisting the deletions in the refcount log.

Figure 10:
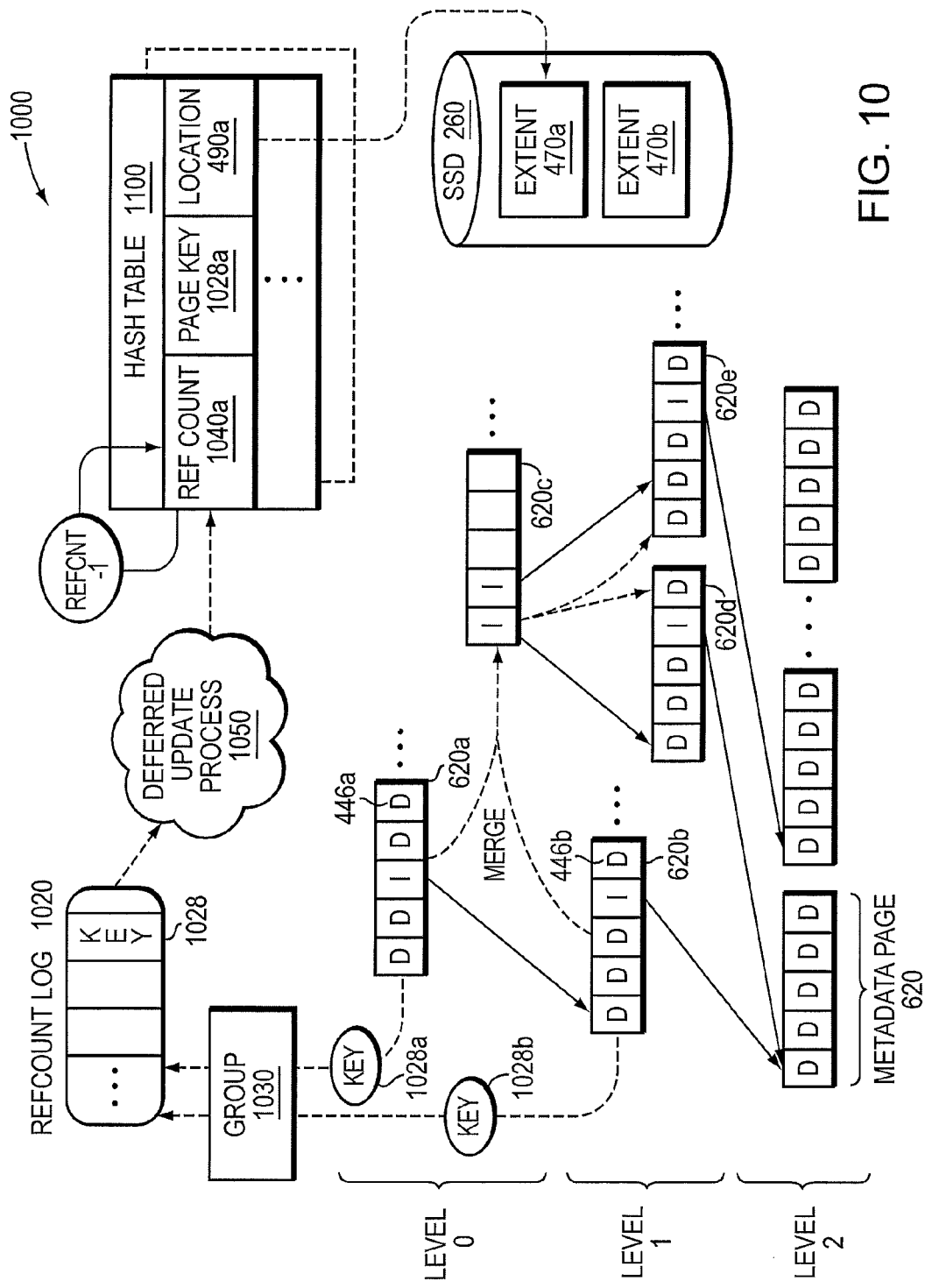
FIG. 10 illustrates a deferred reference count update technique.

FIG. 10 illustrates the deferred reference count update technique 1000 which may apply to deletion of the entire LUN or portion of the LUN, including overwrite of the LBA range (i.e., offset range) within the LUN, wherein one or more existing volume metadata entries 446 (i.e., LBA-to-extent key mappings) are deleted. According to the deferred reference count update technique, one or more requests to delete volume metadata entries 446*a,b* may be represented as page (metadata) keys 1028*a,b* associated with metadata pages 620*a,b* having those volume metadata entries during the merge operation. Accordingly, the storage space associated with those metadata pages may be freed in an out-of-band fashion (i.e., not during the merge). Illustratively, the page keys 1028*a,b* of the metadata pages 620*a,b* may be persistently recorded in a set of data structures embodied as a refcount log 1020 (e.g., a circular log) to thereby allow the merge operation to complete without resolving deletion (e.g., reference count reduction) of the keys (and, thus, freeing of the space of the extents 470*a,b* on SSD storing the metadata pages 620*a,b* associated with the page keys 1028*a,b*). Note that key deletion may occur when a reference count 1040*a* associated with the page key 1028*a* reduces to a sentinel value (e.g., zero).

A batch (i.e., group) of page keys 1030 (i.e., associated with the metadata pages 620*a,b* to be deleted) may be organized as one or more delete requests and inserted into the refcount log 1020 by the volume layer in a manner that maintains concurrency. During the merge operation, existing metadata pages 620*a,b* of, e.g., a top level (metadata page 620*a*) and a next level (metadata page 620*b*) of the dense tree may be deleted and rewritten as new metadata pages 620*c,d,e*. The page keys of the batch 1030 of the existing metadata pages 620*a,b* may be organized, e.g., in memory, as one or more pending delete requests. Note that the reference count log may support increments (i.e., duplicates), e.g., "make reference" (MKREF), of pages as well as decrements (i.e., deletion requests), e.g., "unreference" (UNREF). Once the merge operation completes, the page keys 1028*a,b* of the delete requests may be inserted into the refcount log. That is, batches of one or more keys may be inserted into the refcount log per batch on a key-by-key basis. Subsequently, a deferred reference count update process 1050 may be spawned (instantiated) to "walk" through the page keys stored in the refcount log and delete (i.e., reference count reduce) each key, e.g., from the extent store layer 350, independently and out-of-band from the merge operation. Note also that only the key is needed for deletion in the extent store layer which need only dereference (i.e., dissociate) the key with the extent. Illustratively, the extent store layer may effect deletion (e.g., reference count of zero) for each key by clearing a corresponding entry in the hash table 1100, thereby dereferencing the extent (e.g., 470*a*) storing the metadata page (e.g., 620*a*) associated with the key (e.g., 1028*a*). Note further that locations of identical metadata pages (e.g., during restart of a merge operation) may also directly replace locations 490 in the hash tables 1100 associated with prior metadata pages and avoid extent hashing 474 (i.e., avoid hashing again the identical metadata page).

Cuckoo Hashing

Figure 11:
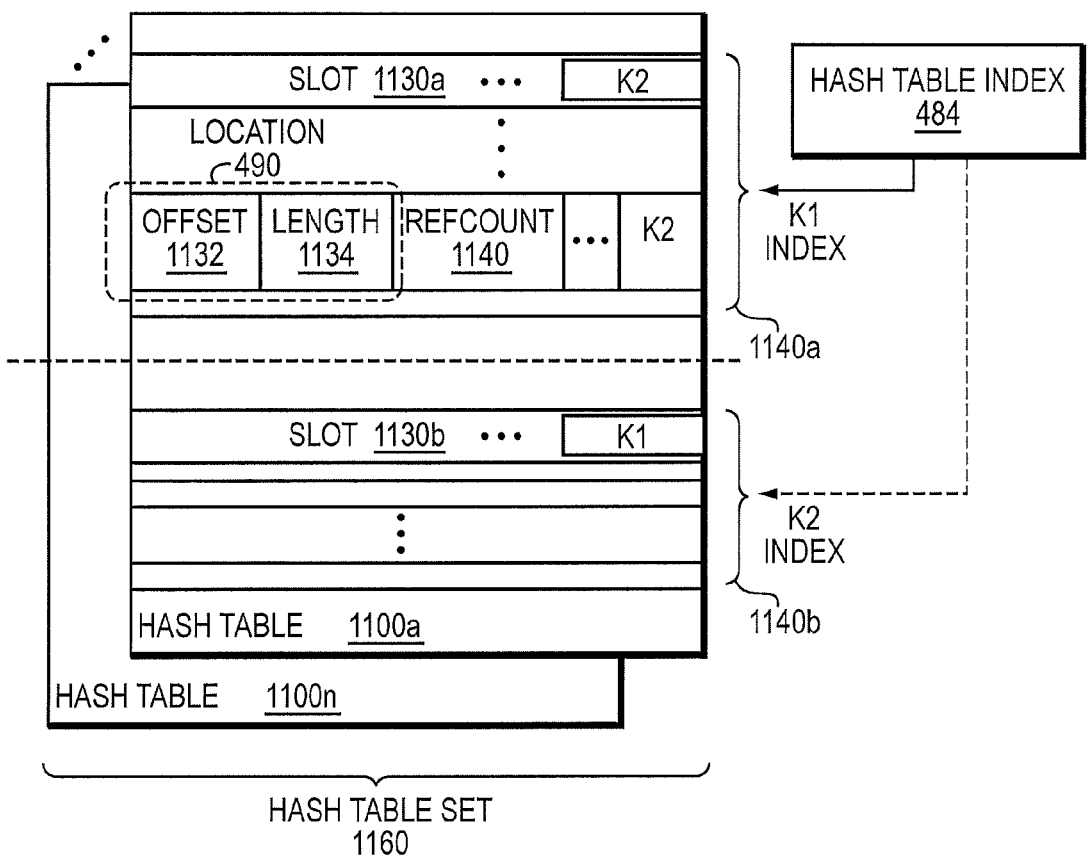
FIG. 11 is a block diagram of a cuckoo hash table.

In an embodiment, hashing may be used in a file system metadata arrangement that reduces an amount of metadata stored in the memory of a node in the cluster and that reduces the amount of metadata needed to process an I/O request at the node. Illustratively, the embodiments include cuckoo hashing and, in particular, a manner in which cuckoo hashing may be modified and applied to construct the file system metadata arrangement. In an embodiment, the file system metadata arrangement may be illustratively configured as a key-value extent store embodied as a data structure, e.g., a cuckoo hash table. FIG. 11 is a block diagram of a cuckoo hash table 1100 that may be advantageously used with one or more embodiments described herein. Illustratively, the extent store metadata resides entirely in the memory 220 of each node 200 and is embodied as a hash table 1100a-n of a set of hash tables 1160 configured to address locations of the SSD. In an embodiment, there are illustratively 768 (3×256) hash tables in the hash table set 1160, wherein each hash table 1100 has a same size. A value, such as a hash table index 484, may be applied to the cuckoo hash table to obtain a key, such as an extent key 475, configured to reference a location 490 of an extent 470 on one or more storage devices, such as SSDs 260. Thus, the cuckoo hash table 1100 embodies extent store metadata that describes the extent and, as such, may be organized to associate a location on SSD with an index, i.e., a value associated with the hash table index 484 identifies the location on SSD. Advantageously, the file system metadata arrangement achieves a high degree of metadata compactness, thus reducing read and write amplification as well as memory requirements.

In an embodiment, storage and retrieval of key-value pairs employ cuckoo hashing, i.e., the set of cuckoo hash tables, using a portion of the hash value 472 as the hash table index 484 (i.e., indexing into the cuckoo hash table), which key is illustratively split in half. Each half of the hash table index may be used as an index into each cuckoo hash table 1100 to determine a potential entry for storing the other half of the hash table index in the table. That is, one half of the hash table index 484 may be used as the index into the cuckoo hash table, while the other half may be used as the value stored in the hash table 1100. Alternatively, the other half of the hash table index may be used as the index, while the one half may be used as the stored value. Thus, the same hash table index 484 can be stored in the cuckoo hash table in two different ways, i.e., either in an upper half or lower half of the cuckoo hash table 1100. This allows higher population, i.e., load factor, in the hash table without chaining, e.g., the use of linked lists, by accessing an entry with the one half of the hash table index as the index and, if the entry is occupied, accessing another entry with the other half of the hash table index as the index. Accordingly, cuckoo hashing reduces an amount of metadata (i.e., the hash table index) stored in the memory of the node as a result of a higher load factor. If both entries are occupied, then one of the two entries is chosen and the prior content of the entry may be evicted and re-inserted into the cuckoo table at an alternate location (i.e., alternate entry) using the prior content as an alternate index to the hash table, i.e., not resolving to either of the two entries. The hash table index 484, i.e., referencing the chosen entry, may then be stored at the alternate location. If the alternate location also is occupied, the prior content of the alternate entry may also be evicted. This eviction process may be repeated until an unoccupied entry is found.

However, as full capacity (i.e., load) of the hash table 1100 is approached, a cycle effect may be realized wherein two or more entries chain together through their present and alternate hash table locations to form a complete cycle; if this occurs, no new insertions can occur at any of these locations. To eliminate this problem, the cuckoo hash table embodies a set associative organization such that, for each entry 1140 that is indexed by half of the hash table index 484, there is a plurality of possible slots 1130 (i.e., a group of slots associated with the index) into which the other half of the hash table index may be inserted/stored, i.e., all of the slots are associated with the indexing hash table index (i.e., the hash table index used to index the group of slots), but each slot 1130 may include a different other half of the hash table index 484. Illustratively, each slot 1130 includes an offset 1132 and a length 1134 which are organized to indicate a location on SSD for an extent "keyed" by the slot; a reference count ("refcount" 1040) indicating a number of metadata references to the extent; and either "K1" or "K2" not used as the hash table index 484 to index to the entry 1140. Generally, a free slot of the plurality of possible slots may be found by linear search of the plurality of slots for the non-indexing half of the hash table index, i.e., if K1 indexes for the entry/slot, a search for K2 is performed. Alternatively, the associative set may be sorted permitting a more efficient search, e.g., a binary search, to be used.

In an embodiment, the cuckoo hash table 1100 may be organized with a 32-way set associativity, i.e., the hash table index stored in the cuckoo hash table may be found in any of 32 slots of the hash table indexed at the one half of the hash table index or any of 32 slots indexed by the other half of the hash table index. If an adequately uniform hash function is used, the distribution may be sufficiently balanced such that there may be unoccupied slots 1130 for a given hash value. That is, as long as the entire hash table is not full, one of the 64 potential slots for the hash table index is likely to be unoccupied so that the hash table index can be inserted into that slot. If all 64 slots are occupied, it is likely that one of the 64 occupants can be moved to an empty entry/slot without any further relocation. Note that every time contents are moved from one entry/slot to another in the hash tables, the corresponding hash table index 484 may be logged to record changes to the hash table. Advantageously, the 32-way set associativity may provide a load factor greater than 98%, so that values inserted into the hash table remain in the slots/entries and are not pushed out by the cuckoo hashing until the table is substantially full. By using the cuckoo hash, two possible entries for an extent key in the hash table can be directly computed and the 64 slots associated with the entries can be inspected, i.e., searched, to find the extent key. Illustratively, entries of the cuckoo hash table may be sized so that all 32 slots for the hash table index fit in a cache line of the CPU 210 enabling a fast linear search of the slots.

Extent Metadata Logging

Figure 12A:
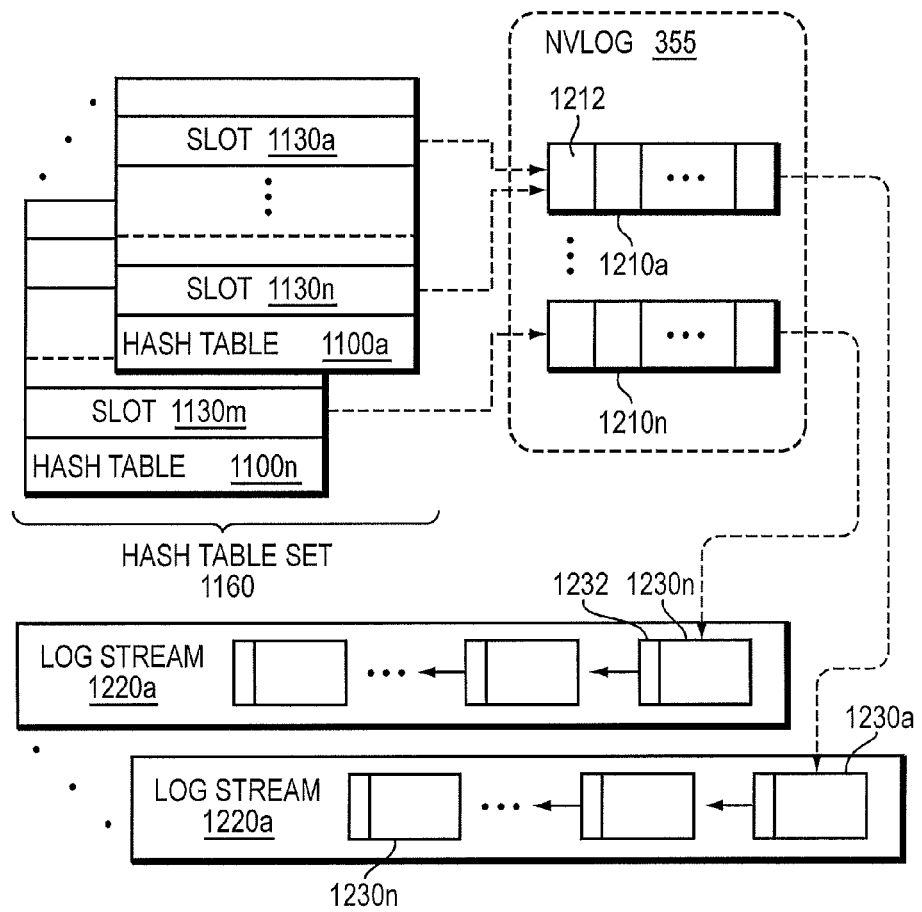
FIG. 12a is a block diagram of a hash table log stream.

FIG. 12a is a block diagram of a hash table log stream that may be advantageously used with one or more embodiments described herein. In an embodiment, changes to the set of hash tables 1160 are illustratively recorded as (e.g., appended to) a continuous stream of changes embodied as the extent store layer log 355 of the NVlogs 285. Illustratively, a separate log stream structure 1210 of the log 355 may be associated respectively with each hash table 1100 such that changed (i.e., dirtied) slots 1130 of the hash table are recorded as entries 1212 in the log stream structure 1210. That is, updates, i.e., changes, from the hash tables are stored in their corresponding log stream structures 1210 prior to storage on SSD. A copy (not shown) of the log stream structure 1210 may be stored in memory 220 (e.g., as an in-core buffer); in addition, previous contents of the log stream structure 1210 may be stored in a corresponding log stream 1220 on SSD. When the log stream structure 1210 grows large enough (e.g., to 8 KB) the in-core copy of the log stream structure 1210 may be written to its corresponding log stream 1220 (i.e., to SSD) as a log stream page 1230 (e.g., an 8 KB page update) in one operation, and a new in-core page may be created in memory 220 to receive further changes from the hash tables. Notably, the log stream structure 1210 may be implemented as a double buffer to accommodate writing to SSD (i.e., log stream 1220) while also recording entries 1212 to the log stream structure. The entries 1212 in the log stream structure 1210 may thereafter be discarded once it is confirmed that the corresponding page, i.e., log stream page 1230, is safely written to SSD. Notably, the log stream 1220*a-n*, i.e., log stream pages 1230*a-n*, may be stored as extents of the extent store instance being logged without relying on that extent store instance's metadata, i.e., without using slots in the hash tables of that extent store instance to locate the log stream pages. Instead, a separate location mechanism may be used to locate the log stream pages. Illustratively, each log stream page 1230 may include a pointer 1232 indicating the location of a previous log stream page on SSD, i.e., reverse chronological order. Alternatively, the log stream pages may be located via an indexing structure (e.g., organizing the log in reverse chronological order) stored in the log stream 1220, e.g., at a known offset, such as at a log stream beginning.

In an embodiment, there may be 256 log streams, which number is illustratively determined based on the time needed for a node 200 to reboot. That is, given a reboot time threshold, e.g., one second, the number of log streams is determined so that the node may begin servicing requests from the volume layer within the reboot time threshold (i.e., a reboot time to service). During reboot, if there are too few log streams (e.g., too many log stream pages associated with each log stream), the aggregate log read rate may be inadequate, because it is desirable that the node be able to serially access each of the log streams. As a result, the node may not be able to meet the reboot time to service. Accordingly, an adequate number of log streams 1220 may be needed, e.g., spread across the SSDs, so that an aggregate read bandwidth of the SSDs is sufficient to meet the reboot time to service. It should be noted that the metadata, i.e., the hash table slots 830*a-n*, are approximately evenly distributed via the extent hashing technique 474, so that no log stream exceeds twice the average log stream size, which provides for evenly distributed read requests among the log streams during reboot to facilitate a low reboot time to service. Further, adequate available cluster resources may also permit multiple hash tables 1100 to be associated with each log stream 1220 as described by an expansion technique in U.S. Pat. No. 8,996,535 titled Extent Hash Structure for Distributed Storage Architecture, to Kimmel et al. issued Mar. 31, 2015 (e.g., increasing the number of hash tables associated with each log stream by three, so that tables 0-2 may map to the first log stream, tables 3-5 may map to the second log stream, etc.).

Figure 12B:
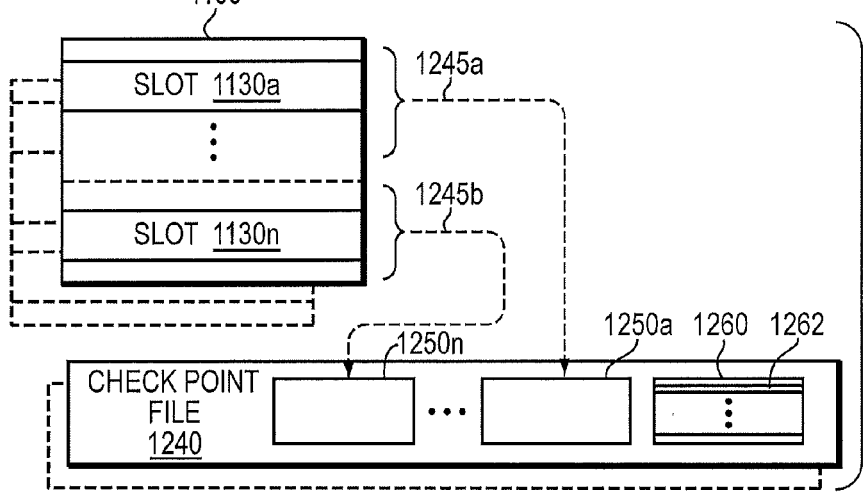
FIG. 12b is a block diagram of a hash table checkpoint file.

Organizing the log streams and hash tables in this fashion may provide locality of reference, so that all of the log entries 1212 in the log stream structures 1210*a-n* for each hash table may be directed to a respective single log stream 1220. Thus, a checkpoint of the metadata in each hash table, i.e., the slots 1130*a-n*, may be stored in a respective checkpoint file associated with that log stream. FIG. 12*b* is a block diagram of a hash table checkpoint file 1240 that may be advantageously used with one or more embodiments described herein. Slots 1130 of the hash table 1100 may be formed into groups 1245 and written as checkpoint having one or more checkpoint pages 1250 within the checkpoint file 1240. The checkpoint pages 1250 and log stream pages 1230 may include the same number of hash table slots and, thus, be of a same size, e.g., 8 KB. In this manner both logging and checkpointing of each hash table are independent of one another. Accordingly, the hash tables (and updates) may be segregated so that when a hash table (or group of hash tables) is associated with a particular CPU or thread of execution (i.e., each hash table has a processor affinity) no complicated locking is necessary to ensure the safety of multi-processing algorithms. For example, CPU 1 may be assigned hash tables 1-10, CPU 2 may be assigned tables 11-20, etc. Thus, an I/O request that is directed to hash table 1 may be processed by CPU 1 every time, so that there is no need for multiprocessor locking in order to achieve high throughput in a multiprocessing environment.

As with the log stream pages 1230 of the log streams, the checkpoint pages 1250 may be stored as extents of the extent store instance being logged without relying on that extent store instance's metadata, i.e., without using slots in the hash tables of that extent store instance to locate the checkpoint pages on SSD. Illustratively, an index table 1260 having index entries 1262 are stored in the checkpoint file 1240, e.g., at a known offset. The index entries 1262 may locate, e.g., as offsets, the checkpoint pages 1250 in the checkpoint file 1240. In alternate embodiments, the checkpoint may include any number of hash tables up to the entire in-core hash table set 1160.

Layered File System

In an embodiment, the volume layer and extent store layer form a layered file system of the storage I/O stack. A log-structured layer (i.e., extent store layer) of the file system provides sequential storage of data and metadata (i.e., log-structured layout) on the SSDs 260 of the cluster to reduce write amplification, while leveraging the variable compression and variable length extent features, as well as the extent de-duplication feature, of the storage I/O stack 300. The data may be organized as an arbitrary number of variable-length extents of one or more host-visible LUNs served by the nodes and stored as extents. The metadata may include mappings from host-visible logical block address ranges (i.e., offset ranges) of a LUN to extent keys (e.g., volume layer metadata), as well as mappings of the extent keys to SSD storage locations of the extents (e.g., extent store layer metadata). Illustratively, the volume layer cooperates with the extent store layer to provide a level of indirection that facilitates efficient log-structured layout of extents on the SSDs by the extent store layer. That is, the extent key mappings maintained by the volume layer allow relocation of the extents on SSD during, e.g., segment cleaning, without update to the volume layer mappings. Accordingly, the storage location of an extent on SSD is effectively "virtualized" by its mapped extent key (i.e., extent store layer mappings) such that relocation of the extent on SSD does not require update to volume layer metadata (i.e., the extent key sufficiently identifies the extent). The virtualization of the storage locations also permits update processes (e.g., cleaning) to occur in the extent store layer without update to volume layer metadata, thereby allowing parallel operations among the layers as well as substantially reducing write amplification.

In an embodiment, the mappings of the extent keys to SSD storage locations are performed and maintained by the extent store layer, while the mappings of the LUN offset ranges to the extent keys are performed and maintained by the volume layer. Separation of these mapping functions between the volume and extent store layers enables different volumes with different offset ranges to reference (map to) a same extent key (and thus a same extent). Notably, separation of the volume layer and extent store layer of the layered file system enables efficient performance of inline de-duplication that illustratively ensures that there is only one copy of each extent stored on the storage arrays of the cluster. Such assurance is global to the cluster as the single copy of the stored extent may span volumes and nodes of the cluster.

Notably, de-duplication may be selectively applied only to data and not metadata (e.g., volume and extent store layer mappings), so as to reduce latency of metadata operations, e.g., writes of metadata. In an embodiment, selective de-duplication may be accomplished by passing a flag in a write operation to the extent store layer.

Figure 13:
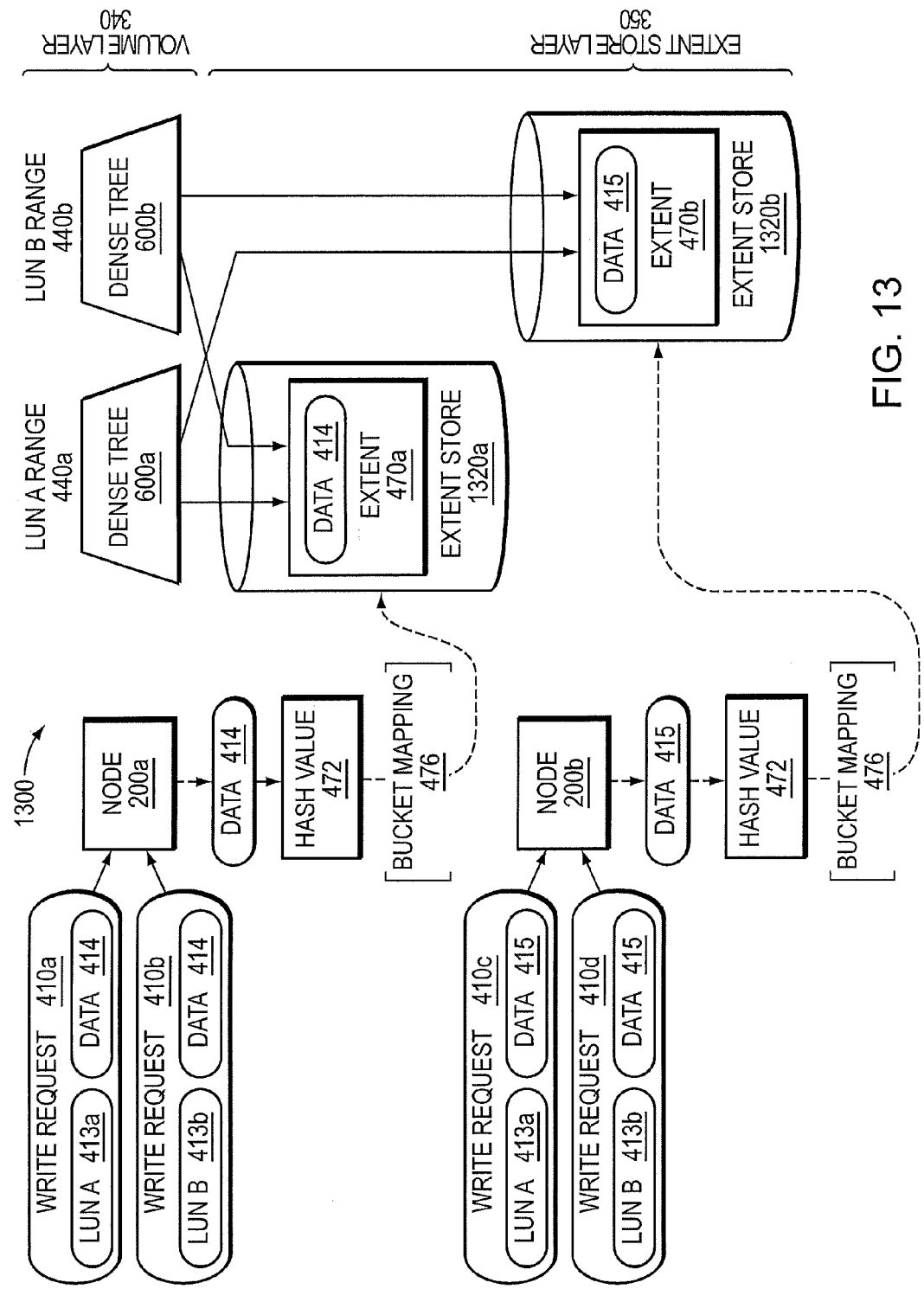
FIG. 13 illustrates a layered file system.

FIG. 13 illustrates a layered file system that may be advantageously used with one or more embodiments described herein. A plurality of write requests 410a,b, each directed to a different LUN having identical write data 414, may be received by a node 200a of the cluster 100. An identical hash value 472a computed from the write data of each write request 410a,b may lead to inline de-duplication (i.e., de-duplication before storage on SSD, as described previously) of that data within an extent store 1320a (i.e., bucket). The dense trees 444a,b for each respective LUN (representing LUN offset ranges 440a,b respectively) may reference the same extent 470a (i.e., may store the same extent key 475, not shown). As such, a reference count in the hash table associated with the extent 470a may be incremented to reflect two references to the data 414 for an extent store instance associated with the extent store 1320a. Similarly, another plurality of write requests 410c,d having different identical write data 415 received by a node 200b of the cluster may lead to de-duplication of that data in another extent store 1320b. Accordingly, the bucket mapping 476 of the hash value 472 may lead to a different extent store 1320b for data 415 than for data 414 (which may lead to extent store 1320a). Again, a reference count in the hash table associated with the extent 470b may be incremented to reflect two references to the data 415 for an extent store instance associated with the extent store 1320b. Note that the dense trees 444a,b for each respective LUN (representing LUN offset ranges 440a,b respectively) may reference the same extent 470b (i.e., may store the same extent key 475, not shown). An extent store instance denotes an instance of an appropriate extent store layer, whereas an extent store denotes actual storage of extents on storage media (e.g., SSDs). As such, an extent store instance is akin to an extent store file system as viewed in-core, whereas an extent store is akin to that extent store file system as view on storage media.

As noted, the persistence layer 330 may compute a hash value 472 on an extent 470 to determine which extent store instance 478 (or extent store) is associated with the extent in accordance with the bucket mapping technique 476. The persistence layer may then pass the hash value 472 to the appropriate volume layer instance, which then passes on the hash value to the appropriate extent store instance via an extent store put operation. The extent store instance may determine whether the extent is previously stored on SSD in accordance with a de-duplication opportunity. If the extent is not stored on the storage arrays of the cluster (i.e., anywhere in the cluster), the extent store instance may form a unique extent key 475 from the hash value 472 prior to storing the extent (as compressed) on SSD and return that unique key to the volume layer instance. However, if it is determined that the extent is stored on any of the storage arrays in the cluster, the extent store instance may return the extent key for that stored extent to the volume layer instance, thereby enabling global inline de-duplication (i.e., de-duplication before storage on SSD) that obviates the need for a duplicate copy of the extent. Thus, the inline global de-duplication opportunity arises from (and thus provides a motivation for) the separation of the file system functions among the layers. Notably, the volume layer may be unaware of de-duplicated data stored only once in the underlying extent store layer. Facilitation of bucket mapping via a hash space and the resulting distribution of data and metadata among the extent store instances of the cluster also arise from the separation of the file system functions among the layers. That is, the volume layer is also unaware of which extent store instance stores an extent, as extent keys are global within the cluster. Thus, the benefit of inline global de-duplication of data and distribution of data (and metadata) within the cluster both result from a separation of the file system functions among the layers.

Advantageously, the separation of the volume and extent store layers permits a storage location of an extent on SSD to be effectively virtualized by its mapped extent key such that relocation of the extent on SSD does not require update to volume layer metadata (i.e., the extent key sufficiently identifies the extent). As noted, virtualization of the storage locations also permits a cleaning process to occur in the extent store layer without update to volume layer metadata, thereby substantially reducing write amplification.

Recovery from Low Space Condition

Embodiments described herein are directed to a technique for recovering from a low space condition associated with storage space reserved in an extent store to accommodate write requests received from a host and associated metadata managed by the layered file system of the storage I/O stack. The write requests, including user data, are persistently recorded on NVRAM 280 (NVLog 335) prior to returning an acknowledgement to the host by the persistence layer 330 of the storage I/O stack 300. The (volume) metadata managed by the volume layer 340 of the layered file system is embodied as mappings from LBAs of a LUN to extent keys 475 maintained by the extent store layer 350 of the layered file system. The volume metadata may be processed as user operations executed by finite state machines (FSMs) at the volume layer, wherein the user operations include dense tree merge, volume region delete, deferred reference count (refcount) log update, and staging buffer flush operations. The extent store metadata managed by the extent store layer 350 is embodied as mappings from the extent keys to the storage locations of the extents 470 on storage devices (SSDs) 260 of storage arrays 150. As used herein, the extent store 1320 may be viewed as a global pool of extents stored on the storage arrays.

Figure 14:
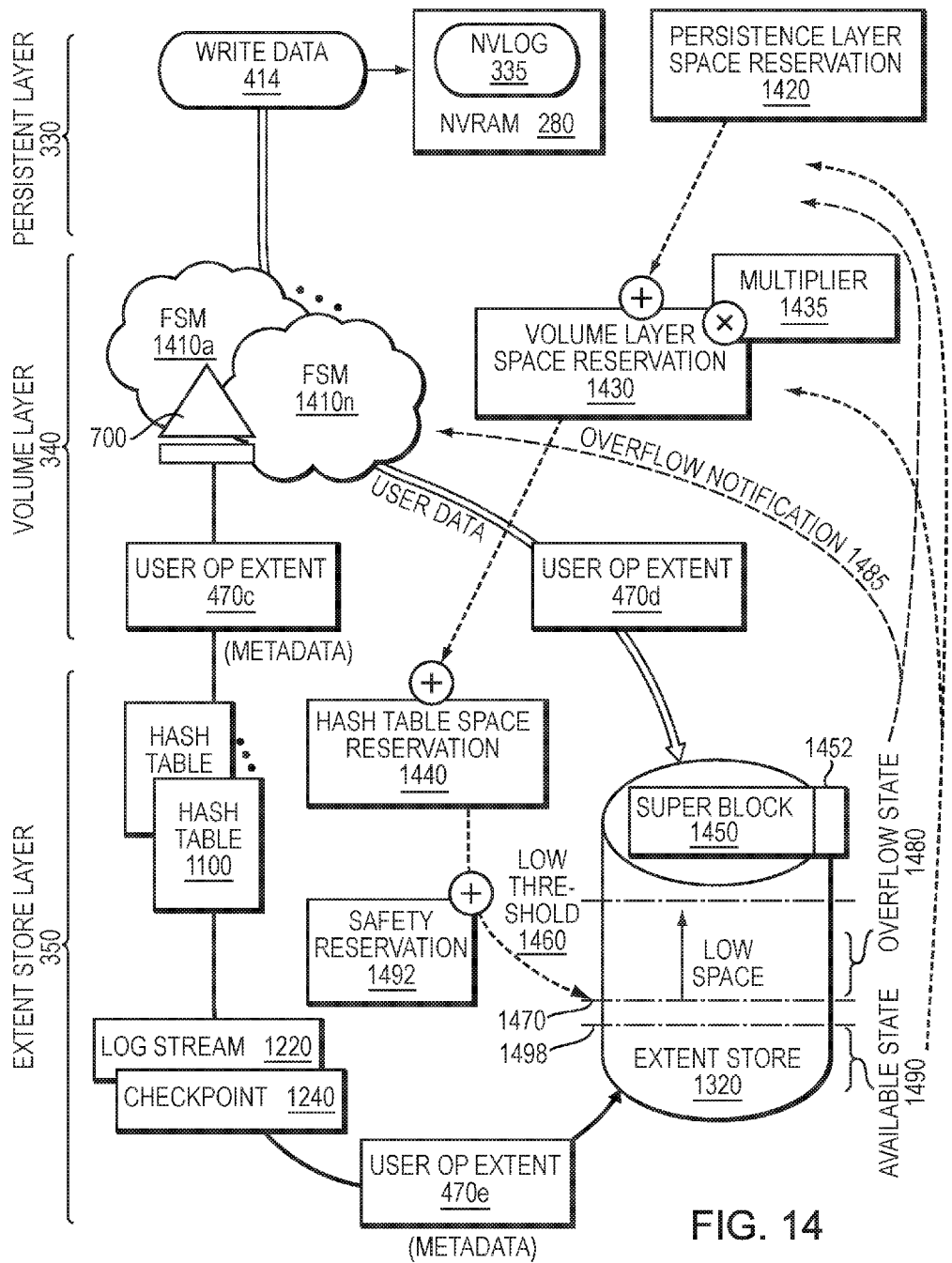
FIG. 14 illustrates a technique for recovering from a low space condition of an extent store.

FIG. 14 illustrates a technique for recovering from a low space condition of the extent store. The space recovery technique accounts for storage space consumed in the extent store by the user operations, i.e., write operations for the user data (write data 414) stored on the NVRAM 280 at the persistence layer 330 as well as the associated volume and extent store metadata (e.g., volume layer dense trees and extent store hash tables), to ensure that the user data and associated metadata can be safely and reliably persisted in the extent store 1320 as, e.g., user operation extents 470c,d,e even during a low space condition. Storage space accounting provides a space reservation budget 1470 of available storage space for the user operation extents, i.e., available user operation storage space for extents storing user data (e.g., user operation extent 470d) and metadata (e.g., user operation extents 470c,e) in the extent store. In an embodiment, at boot time of the node, the persistence layer 330 and volume layer 340 may notify the extent store layer 350 to reserve storage space in the extent store 1320. The storage space reserved by the persistence layer (i.e., persistence layer space reservation 1420 in the extent store 1320) is based on the size and number of NVLogs 335 in the NVRAM 280. Illustratively, a persistence layer space reservation 1420 is calculated (e.g., at a process of the persistence layer) by multiplying the number of NVLogs 335 in the NVRAM 280 by a size of an NVLog 335, i.e., sizeof (persistence layer space reservation)=numberof(NVLogs 335)*sizeof(NVLog 335).

The volume layer 340 may base its reservation (i.e., volume layer space reservation) on worst case assumptions about the metadata storage space usage by its FSMs. For example, there may be FSMs 1410a-n associated with dense tree merge, volume region delete, deferred refcount log update, and staging buffer flush operations. A volume layer space reservation 1430 may take into account (i) a total number of concurrent dense tree merge and volume region delete FSMs per UP service, (ii) a worst case metadata and refcount log space requirement per dense tree merge or volume region delete operation, (iii) a total number of UP services in the volume layer, and (iv) a maximum number of staging buffers that the volume layer may allocate. The volume layer space reservation may also be based on a multiplier 1435 that provides a safety net to ensure that there is always enough free storage space in the extent store to accommodate delayed flushing (writing) of the user data (temporarily) recorded in the NVLog 345 to SSD 260, as this data has already been committed to the host. Since the file system is message-based, the multiplier may be applied to also include consideration of any delays in messages that the extent store layer may receive or send. The safety net multiplier 1435 is based on the assumption that draining the refcount log releases space at a same rate at which it is being consumed by the merge and volume delete FSMs. The multiplier may be set to a value that is determined heuristically. Illustratively, the volume layer space reservation 1430 may be calculated (e.g., at a process of the volume layer) by adding the maximum number of staging buffers that the volume layer may allocate to a sum of the number of concurrent volume region delete FSMs times the worst case refcount log space requirement per volume region delete operation and the number of concurrent dense tree merge FSMs times the sum of the worst case refcount log space requirement per dense tree merge operation and the worst case metadata space requirement per dense tree merge operation, multiplied by the number of UP services in the volume layer and the safety net multiplier. That is, sizeof(volume layer space reservation)=
multiplier*numberof(UP services in volume
layer)*((numberof(dense tree merge FSMs)*
(sizeof(worst case refcount log space requirement per dense tree merge)+sizeof(worst case
metadata requirement per dense tree merge)))+
(numberof(volume region delete FSMs)*sizeof
(worst case refcount log space requirement per
volume region delete)))+numberof(maximum
staging buffers allocated by the volume layer).

Note that an additional space reservation may include FSMs involving other user operations (i.e., operations other than dense tree merge, volume region delete, deferred refcount update, and staging buffer flush).

In an embodiment, the extent store layer 350 monitors the available user operation storage space of the space reservation budget in response to each write operation to the storage array 150, i.e., when a data stripe 464 is written across SSDs of a RAID group as, e.g., one or more full stripe writes 462. Thereafter, the extent store layer determines whether the available user operation storage space on SSD is lower than or equal to the space reservation budget 1470. When the available user operation storage space of the space reservation budget is consumed, i.e., the low space condition is reached, the extent store layer sends an overflow event notification message 1485 to the persistence and volume layers, notifying the layers that the extent store 1320 is in an overflow state 1480. In an embodiment, one or more processes of the extent store layer 350 may contain computer executable instructions executed by the CPU 210 to perform operations that cooperate with processes of the persistence and volume layers to implement the space recovery technique described herein.

In addition to such message-based notification, the extent store layer may also set a flag 1452 in an extent store (ES) superblock 1450 to mark the overflow state. The ES superblock flag 1452 may be used to recover the storage space state of the extent store after a crash or a shutdown and to resend notifications to the volume and persistence layers that the extent store is in overflow state, if necessary. Specifically, if the extent store layer detects at boot time that it crashed or was shut down in the overflow state, i.e., the ES superblock flag is set, the extent store layer 350 sends an overflow event notification message 1485 to the persistence and volume layers, thereby notifying those layers that the extent store 1320 is in an overflow state 1480 (i.e., the extent store recovers to the overflow state). Since hash tables may be loaded asynchronously at boot time, the set ES superblock flag 1452 ensures that the extent store layer 350 is aware of the overflow state of the extent store and can notify persistence and volume layers immediately, before the hash tables are fully loaded.

In addition to monitoring the available storage space of the space reservation budget 1470, the extent store layer 350 may also perform hash table space accounting to ensure sufficient (available) user operation storage space in the extent store for extent store metadata (e.g., hash table logs and checkpoint files) for data in NVRAM, e.g., NVLog 355, that is destined for storage on SSD. Illustratively, available storage space is calculated in response to each full stripe write 462 from the extent store and compared to a hash table space reservation 1440. The hash table space reservation size may take into account (i) a maximum hash table space that can be consumed, (ii) a percentage of the hash table space in use at the time of calculation, and (iii) a threshold percentage at which the storage space available for hash tables (i.e., the hash table space reservation size) is considered in overflow state (overflow threshold percentage). The result of the hash table space accounting is an approximation of the physical space consumed by the hash table logging and checkpoint files (ht_stored) that are used in monitoring low space reservation at the extent store layer level. Illustratively, if the percentage of the hash table space in use is smaller than the overflow threshold percentage, then ht_stored is calculated as the percentage of the hash table space in use divided by the product of the hash table overflow threshold percentage and the maximum hash table space that can be consumed. If the percentage of the hash table space in use is equal to or greater than the overflow threshold percentage, then ht_stored is set to a maximum hash table space that can be consumed. Note that ht_stored is an approximated number that may be greater than the actual physical space used by the extent store layer metadata, e.g., hash table logs and checkpoint files, which may be highly compressible data. Accordingly, the hash table space reservation size as described herein ensures prudently that ht_stored may be used for monitoring the low space reservation in lieu of monitoring actual physical space consumed.

Illustratively, in response to an overflow event notification, new write requests from the host are not accepted (halted) at the persistence layer 330 and the FSMs at the volume layer 340 slowly drain (pass) any processed metadata of pending user operations, e.g., via extent store put operations, to the extent store 1320 until user operation storage space is released. Halting of new write requests from the host ensures that all pending write requests and associated user data stored in the NVLog 335 may be flushed to SSD. In addition, the volume layer may throttle (or suspend) the FSMs to ascertain that the processed volume metadata does not exceed the volume layer space reservation. The volume layer may also continuously track the metadata footprint within the volume layer space reservation to ensure that the processed volume metadata fits within the volume layer space reservation even when the extent store is not in the overflow state or low space condition.

In an embodiment, if the amount of additional extent store storage space used during the low space condition exceeds a low space reserve threshold 1460, the extent store layer 350 sends a no space event notification (not shown) to the persistence and volume layers, wherein the extent store layer does not accept (i.e., refuses to accept) any additional extent store put operations. The size of the low space reservation may be a combination of a persistence layer low space reservation, a volume layer low space reservation, and an additional safety low space reservation 1492. The additional safety low space reservation may be included to account for any delays in messages that the extent store layer may receive or send. Note that the safety low space reservation 1492 may be used in addition to the multiplier 1435 to account for message delays. Illustratively, when the volume and persistence layers acknowledge the overflow notification, the extent store layer starts monitoring the space used by the various layers (i.e., persistent, volume and extent store layers). If the space usage crosses the low space reserve, the no space event message is sent to the volume and persistence layers in reply to any request to store data and metadata (i.e., in response to the put operation to store a user operation extent 470c,d,e). Unlike the overflow state, which only refuses new write requests (i.e., user data) from the host but allows writes to be pushed from the persistence and volume layers to the extent store, the extent store layer will not accept any writes (i.e., data or metadata) from any of the other layers in the low space state. The low space reserve threshold is therefore a hard limit to assist with maintaining a certain minimum amount of storage space required for segment cleaning activity. Illustratively, the persistence layer low space reservation may be set to a maximum possible number of outstanding user writes for the data stored in NVRAM, i.e., NVLog 335, while the volume layer low space reservation may be set to a maximum possible amount of metadata that can be sent from the volume layer, as described above. The additional safety low space reservation may be set to a heuristically determined number, e.g., 10 GB.

Illustratively, upon the released user operation storage space exceeding an available space threshold 1498, the extent store layer 350 transitions to an available state 1490 (from the overflow state 1480) and sends an available event notification to the volume and persistence layers that instructs the layers that they may resume operation, including the acceptance of new write requests from the host. Notably, the available threshold 1498 may be different from the space reservation budget to avoid unnecessary and frequent transitions from the available state to overflow state and back (i.e., the difference between the space reservation budget and available threshold provides a hysteresis). As space is freed up in the extent store, the available free space for user data and metadata may cross the "available" threshold. In that case, the extent store layer notifies the persistence layer and volume layer that the extent store is available again. The persistence layer can then accept new user writes from the host. Further, FSMs of the volume layer throttled or suspended during the overflow state are resumed or allowed to complete at full speed. In addition, the ES superblock flag 1452 is updated immediately upon reaching the available threshold to ensure that the extent store does not return to the overflow state in case of a crash or a shutdown.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a central processing unit (CPU) of a storage system coupled to one or more storage devices of a storage array configured as an extent store; and
a memory coupled to the CPU and configured to store a storage input/output (I/O) stack having a plurality of layers executable by the CPU, the storage I/O stack configured to accept user data of write requests from a host and process the user data and metadata associated with the user data as user operations executed by finite state machines (FSMs), the storage I/O stack configured to provide an available user operation storage space of a space reservation budget in the extent store for storage of the user data and the associated metadata, the storage I/O stack further configured to (i) halt acceptance of new write requests when a low space condition of the space reservation budget is reached and (ii) pass the associated metadata from the FSMs to the extent store until release of the available user operation storage space exceeds an available space threshold, wherein the space reservation budget includes a persistence layer space reservation and a volume layer space reservation, determined at boot time, to reserve storage space in the extent store for the user operations.

2. The system of claim 1 wherein the associated metadata is passed to the extent store using extent store put operations, and wherein the user data and the associated metadata are stored in the extent store as user operation extents.

3. The system of claim 2 wherein the storage I/O stack is configured to send an overflow event notification to one or more layers of the storage I/O stack when the low space condition of the space reservation budget is reached.

4. The system of claim 3 wherein execution of the user operations using the FSMs is throttled in response to the overflow event notification.

5. The system of claim 3 wherein the storage I/O stack is configured to send an available event notification to the one or more layers when the release of the available user operation storage space exceeds the available space threshold.

6. The system of claim 5 wherein the available event notification instructs the storage I/O stack to accept the new write requests from the host.

7. The system of claim 5 wherein the storage I/O stack is further configured to send a no space event notification to the one or more layers when an amount of additional extent store storage space used during the low space condition exceeds a low space reserve threshold.

8. The system of claim 7 wherein the storage I/O stack is configured to refuse acceptance of additional user operations in response to the no space event notification.

9. The system of claim 2 further comprising a non-volatile random access memory (NVRAM) coupled to the CPU, the NVRAM having one or more non-volatile logs (NVLogs) configured to temporarily record the user data.

10. The system of claim 9 wherein the persistence layer space reservation is based on a size and number of the NVLogs in the NVRAM.

11. The system of claim 9 wherein the volume layer space reservation is based on metadata storage space usage by the FSMs.

12. The system of claim 11 wherein a multiplier is applied to the volume layer space reservation to ensure the available user operation storage space in the extent store for delayed writing to the one or more storage devices of the user data temporarily recorded in the NVLogs.

13. The system of claim 1 wherein the user operations include write operations to the storage array and wherein the storage I/O stack is configured to monitor the available user operation storage space of the space reservation budget in response to each write operation.

14. The system of claim 13 wherein the storage I/O stack is further configured to perform accounting of the metadata used by one or more layers of the storage I/O stack to ensure the available user operation storage space in the extent store for the accounted metadata destined for storage on the storage devices.

15. The system of claim 14 wherein the accounted metadata comprises hash table logs and checkpoint files.

16. A method comprising:
accepting user data of write requests at a storage input/output (I/O) stack executing on a processor coupled to storage devices configured as an extent store;
processing metadata associated with the user data as user operations executed by finite state machines (FSMs);
providing an available user operation storage space of a space reservation budget in the extent store for storage of the user data and the associated metadata;
halting acceptance of new write requests when a low space condition of the space reservation budget is reached; and
passing the associated metadata from the FSMs to the extent store until release of the available user operation storage space exceeds an available space threshold, wherein the space reservation budget includes a persistence layer space reservation and a volume layer space reservation, determined at boot time, to reserve storage space in the extent store for the user operations.

17. The method of claim 16 further comprising, wherein the user operations include write operations to the storage devices:
monitoring the available user operation storage space of the space reservation budget in response to each write operation to the storage devices.

18. The method of claim 17 further comprising:
performing accounting of the associated metadata used by one or more layers of the storage I/O stack to ensure the available user operation storage space in the extent store for accounted metadata destined for storage on the storage devices.

19. A non-transitory computer readable medium including program instructions for execution on one or more processors coupled to storage devices configured as an extent store, the program instructions configured to:
accept user data of write requests at a storage input/output (I/O) stack executing on the one or more processors;
process metadata associated with the user data as user operations executed by finite state machines (FSMs);
provide an available user operation storage space of a space reservation budget in the extent store for storage of the user data and the associated metadata;
halt acceptance of new write requests when a low space condition of the space reservation budget is reached; and
pass the associated metadata from the FSMs to the extent store until release of the available user operation storage space exceeds an available space threshold, wherein the space reservation budget includes a persistence layer space reservation and a volume layer space reservation, determined at boot time, to reserve storage space in the extent store for the user operations.

* * * * *

UNITED STATES PATENT AND TRADEMARK OFFICE
CERTIFICATE OF CORRECTION

PATENT NO. : 9,846,539 B2  
APPLICATION NO. : 15/004101  
DATED : December 19, 2017  
INVENTOR(S) : Sriranjani Babu et al.

Page 1 of 1

It is certified that error appears in the above-identified patent and that said Letters Patent is hereby corrected as shown below:

In the Specification
Column 5, Line 43 reads:
"LUN identifier (ID), a logical block address (LB A) of the"
Should read:
--LUN identifier (ID), a logical block address (LBA) of the--

Signed and Sealed this
Third Day of December, 2019

Andrei Iancu
*Director of the United States Patent and Trademark Office*